United States Patent
Gohn et al.

(10) Patent No.: US 12,107,468 B2
(45) Date of Patent: Oct. 1, 2024

(54) BRUSHLESS DC MOTOR HAVING HIGH POWER DENSITY FOR POWER TOOL

(71) Applicant: Black & Decker Inc., New Britain, CT (US)

(72) Inventors: Barak N. Gohn, Shrewsbury, PA (US); Colin M. Crosby, Baltimore, MD (US); Nicholas J. Lowe, Lutherville-Timonium, MD (US); James R. Clarke, York, PA (US); Daniel F. Heck, Toms River, NJ (US); Michael P. Sikora, Baltimore, MD (US); Christian B. Rogerson, Towson, MD (US); Ryan F. Schroeder, Hampstead, MD (US); Connor T. Mohan, Fallston, MD (US); Michael D. Grove, Windsor, PA (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/550,323

(22) Filed: Dec. 14, 2021

(65) Prior Publication Data
US 2022/0200414 A1    Jun. 23, 2022

Related U.S. Application Data

(60) Provisional application No. 63/129,797, filed on Dec. 23, 2020.

(51) Int. Cl.
*H02K 21/12*    (2006.01)
*H02K 1/16*    (2006.01)
(Continued)

(52) U.S. Cl.
CPC ............... *H02K 21/12* (2013.01); *H02K 1/16* (2013.01); *H02K 1/165* (2013.01); *H02K 1/27* (2013.01);
(Continued)

(58) Field of Classification Search
CPC .......... H02K 1/165; H02K 3/28; H02K 7/145; H02K 21/12; H02K 1/16; H02K 1/27;
(Continued)

(56) References Cited

U.S. PATENT DOCUMENTS

| | | | |
|---|---|---|---|
| 5,155,403 A | 10/1992 | Dyke et al. | |
| 5,973,428 A | 10/1999 | Zakrocki et al. | |

(Continued)

FOREIGN PATENT DOCUMENTS

| | | |
|---|---|---|
| CN | 201918864 U | 8/2011 |
| CN | 203352326 U | 12/2013 |

(Continued)

OTHER PUBLICATIONS

JP2020171178A English translation (Year: 2023).*
(Continued)

*Primary Examiner* — Terrance L Kenerly
*Assistant Examiner* — Viswanathan Subramanian
(74) *Attorney, Agent, or Firm* — Amir R. Rohani

(57) ABSTRACT

A brushless direct-current (BLDC) motor for a power tool includes a rotor assembly and a stator assembly including stator windings. A ratio of a motor size (Km) constant of the motor to an electrical envelope of the motor including electrical parts of the motor is greater than approximately 850 (N·m/√W)/m^3. A ratio of a motor size (Km) constant of the motor to a magnetic envelope of the motor including stator core and windings is greater than approximately 980 (N·m/√W)/m^3.

17 Claims, 28 Drawing Sheets

| Motor | Stator Diameter (OD) | Electrical Length (EL) | Magnetic Length (ML) | Max Pout | Km Constant N·m/√W | Km per Magnetic Volume (N·m/√W)/m^3 | Km per Electric Volume (N·m/√W)/m^3 |
|---|---|---|---|---|---|---|---|
| Motor 100 (1 Coil/Tooth) | 51 mm | 40 mm | 36.4 mm | 1840 Watts | 0.0762 | 1024 | 933 |
| Motor 100 (2 Coil/Tooth) | 51 mm | 40 mm | 36.4 mm | 1895 Watts | 0.0804 | 1081 | 984 |
| Motor 100 (3 Coil/Tooth) | 51 mm | 40 mm | 36.4 mm | 1922 Watts | 0.0826 | 1111 | 1012 |
| Motor 100 (4 Coil/Tooth) | 51 mm | 40 mm | 36.4 mm | 1950 Watts | 0.0851 | 1143 | 1042 |
| Conventional Example 1 | 51 mm | 40 mm | 364 mm | 1016 Watts | 0.0471 | 633 | 576 |
| Conventional Example 2 | 40 mm | 65 mm | 58.2 mm | 1507 Watts | 0.0636 | 855 | 778 |
| Conventional Example 3 | 61 mm | 28 mm | 25.5 mm | 1057 Watts | 0.0623 | 838 | 763 |

(51) Int. Cl.
| | |
|---|---|
| *H02K 1/27* | (2022.01) |
| *H02K 1/276* | (2022.01) |
| *H02K 1/28* | (2006.01) |
| *H02K 3/28* | (2006.01) |
| *H02K 3/46* | (2006.01) |
| *H02K 3/52* | (2006.01) |
| *H02K 5/16* | (2006.01) |
| *H02K 7/14* | (2006.01) |
| *H02K 9/06* | (2006.01) |
| *H02K 11/33* | (2016.01) |
| *H02K 21/16* | (2006.01) |
| *B25F 5/00* | (2006.01) |
| *H02K 11/215* | (2016.01) |

(52) U.S. Cl.
CPC .............. *H02K 1/276* (2013.01); *H02K 1/28* (2013.01); *H02K 3/28* (2013.01); *H02K 3/46* (2013.01); *H02K 3/522* (2013.01); *H02K 5/16* (2013.01); *H02K 7/145* (2013.01); *H02K 9/06* (2013.01); *H02K 11/33* (2016.01); *H02K 21/16* (2013.01); *B25F 5/001* (2013.01); *H02K 11/215* (2016.01); *H02K 2203/03* (2013.01); *H02K 2213/03* (2013.01)

(58) Field of Classification Search
CPC ............ H02K 1/276; H02K 1/28; H02K 3/46; H02K 3/522; H02K 9/06; H02K 21/16; H02K 11/215; H02K 2203/03; H02K 5/16; H02K 11/33; H02K 2213/03; H02K 1/146; H02K 29/00; B25F 5/001
See application file for complete search history.

(56) References Cited

U.S. PATENT DOCUMENTS

| | | | |
|---|---|---|---|
| 6,025,665 | A | 2/2000 | Poag et al. |
| 6,300,697 | B1 | 10/2001 | Findeisen et al. |
| 6,472,783 | B1 | 10/2002 | Witthohn et al. |
| 6,570,365 | B1 | 5/2003 | Hsu |
| 6,674,207 | B2 | 1/2004 | Blasco Remacha |
| 6,984,909 | B2 | 1/2006 | Kadoya et al. |
| 7,294,944 | B2 | 11/2007 | Fujii |
| 7,411,326 | B2 | 8/2008 | Achor et al. |
| 7,501,730 | B2 | 3/2009 | Kimura et al. |
| 7,622,834 | B2 | 11/2009 | Fujii et al. |
| 7,663,277 | B2 | 2/2010 | Kinoshita et al. |
| 7,839,033 | B2 | 11/2010 | Fujii et al. |
| 7,893,578 | B2 | 2/2011 | Hayashi et al. |
| 8,299,675 | B2 | 10/2012 | Horng et al. |
| 8,390,165 | B2 | 3/2013 | Nishiyama et al. |
| 8,536,756 | B2 | 9/2013 | Watanabe et al. |
| 8,653,711 | B2 | 2/2014 | Burch et al. |
| 8,796,967 | B2 | 8/2014 | Sato |
| 9,033,117 | B2 | 5/2015 | Ma et al. |
| 9,272,686 | B2 | 3/2016 | Chang et al. |
| 9,287,745 | B2 | 3/2016 | Akatsu et al. |
| 9,318,932 | B2 | 4/2016 | Purohit et al. |
| 9,331,544 | B2 | 5/2016 | Okinaga et al. |
| 9,403,505 | B2 | 8/2016 | Chang et al. |
| 9,450,472 | B2 | 9/2016 | Hatfield et al. |
| 9,502,931 | B2 | 11/2016 | Yamada |
| 9,627,934 | B2 | 4/2017 | Qin et al. |
| 9,819,241 | B2 | 11/2017 | Smith et al. |
| 9,893,576 | B2 | 2/2018 | Mikami et al. |
| 9,966,807 | B2 | 5/2018 | Yokoyama et al. |
| 9,966,813 | B2 | 5/2018 | Nakano et al. |
| 10,056,806 | B2 | 8/2018 | Hatfield et al. |
| 10,063,125 | B2 | 8/2018 | Jang et al. |
| 10,205,365 | B2 | 2/2019 | Beyerl et al. |
| 10,432,065 | B2 | 10/2019 | Beyerl et al. |
| 10,442,009 | B2 * | 10/2019 | Sergyeyenko ........ B25B 21/007 |
| 10,523,080 | B2 | 12/2019 | Smith et al. |
| 10,786,894 | B2 | 9/2020 | Coates et al. |
| 11,139,722 | B2 | 10/2021 | Velderman et al. |
| 2005/0017591 | A1 | 1/2005 | Brewster et al. |
| 2006/0152907 | A1 | 7/2006 | Rathmann |
| 2010/0320880 | A1 | 12/2010 | Kamogi |
| 2013/0076195 | A1 | 3/2013 | Li et al. |
| 2013/0162072 | A1 | 6/2013 | Mizutani et al. |
| 2013/0169086 | A1* | 7/2013 | Chai ........................ H02K 3/28 |
| | | | 310/71 |
| 2013/0264904 | A1 | 10/2013 | Taniguchi et al. |
| 2013/0342041 | A1 | 12/2013 | Ayers et al. |
| 2014/0132093 | A1 | 5/2014 | Purohit et al. |
| 2014/0265748 | A1 | 9/2014 | Clendenen et al. |
| 2016/0336838 | A1 | 11/2016 | Kouda et al. |
| 2017/0106522 | A1 | 4/2017 | Coates et al. |
| 2017/0288499 | A1 | 10/2017 | Beyerl et al. |
| 2017/0338726 | A1 | 11/2017 | Gandel et al. |
| 2018/0148651 | A1 | 5/2018 | Koseoglu |
| 2018/0294688 | A1 | 10/2018 | Smith et al. |
| 2019/0023248 | A1 | 1/2019 | Yasui |
| 2019/0044110 | A1* | 2/2019 | Sheeks ..................... H02K 5/15 |
| 2019/0273421 | A1 | 9/2019 | Velderman et al. |
| 2019/0356197 | A1 | 11/2019 | Beyerl et al. |
| 2019/0356201 | A1 | 11/2019 | Li et al. |
| 2020/0091784 | A1* | 3/2020 | Benner, Jr. ............... H02K 3/16 |
| 2020/0091793 | A1 | 3/2020 | Smith et al. |
| 2020/0162007 | A1 | 5/2020 | Sheeks et al. |
| 2020/0244127 | A1 | 7/2020 | Birkmayer et al. |
| 2022/0077750 | A1 | 3/2022 | Velderman et al. |

FOREIGN PATENT DOCUMENTS

| | | |
|---|---|---|
| CN | 203933325 U | 11/2014 |
| CN | 205566022 U | 9/2016 |
| CN | 205986473 U | 2/2017 |
| CN | 208046342 U | 11/2018 |
| CN | 210669831 U | 6/2020 |
| DE | 102005039176 A1 | 2/2007 |
| DE | 102010049682 A1 | 5/2011 |
| DE | 102012113095 A1 | 7/2013 |
| DE | 102012215735 A1 | 3/2014 |
| DE | 102013108118 A1 | 5/2014 |
| DE | 102016224425 A1 | 6/2018 |
| EP | 1235327 A2 | 8/2002 |
| EP | 1385256 A1 | 1/2004 |
| EP | 1040550 B1 | 2/2004 |
| EP | 1728414 B1 | 9/2007 |
| EP | 1863148 A2 | 12/2007 |
| EP | 1324474 B1 | 10/2008 |
| EP | 1751837 B1 | 10/2009 |
| EP | 2670028 B1 | 12/2013 |
| EP | 2391480 B1 | 11/2015 |
| EP | 2228886 B1 | 5/2016 |
| EP | 2739856 B1 | 11/2016 |
| EP | 3160021 A1 | 4/2017 |
| EP | 2633618 B1 | 9/2017 |
| EP | 3007330 B1 | 9/2017 |
| EP | 3255759 A1 | 12/2017 |
| EP | 3297140 A1 | 3/2018 |
| EP | 3113336 B1 | 12/2018 |
| EP | 1384307 B1 | 3/2019 |
| EP | 2678922 B1 | 3/2019 |
| EP | 3436221 A4 | 3/2019 |
| EP | 2195910 B1 | 5/2019 |
| EP | 2264858 B1 | 6/2019 |
| EP | 2584672 B1 | 8/2019 |
| EP | 3203005 B1 | 8/2019 |
| EP | 3580832 A1 | 12/2019 |
| EP | 1875586 B1 | 1/2020 |
| EP | 3603896 A1 | 2/2020 |
| EP | 2557666 B1 | 5/2020 |
| EP | 3340440 B1 | 7/2020 |
| JP | 09228986 A | 9/1997 |
| JP | 2002119005 A | 4/2002 |
| JP | 2002153005 A | 5/2002 |
| JP | 2002223552 A | 8/2002 |
| JP | 2012050297 A | 3/2012 |
| JP | 2017070110 A | 4/2017 |
| JP | 2020171178 A * | 10/2020 |

(56) References Cited

FOREIGN PATENT DOCUMENTS

| | | |
|---|---|---|
| KR | 20040032389 A | 4/2004 |
| KR | 20090042597 A | 4/2009 |
| TW | 201230615 A | 7/2012 |
| WO | 2003066262 A2 | 8/2003 |
| WO | 2011159674 A1 | 12/2011 |
| WO | 2016177366 A1 | 11/2016 |
| WO | 2017212574 A1 | 12/2017 |
| WO | 2018020650 A1 | 2/2018 |
| WO | 2018148651 A1 | 8/2018 |
| WO | 2018176888 A1 | 10/2018 |
| WO | 2019006452 A2 | 1/2019 |
| WO | 2019023379 A1 | 1/2019 |
| WO | 2020038879 A1 | 2/2020 |
| WO | 2020061756 A1 | 4/2020 |
| WO | 2020082550 A1 | 4/2020 |
| WO | WO-2020247326 A1 * 12/2020 ............. H02K 1/148 |

OTHER PUBLICATIONS

JP2012050297A English translation (Year: 2023).*
EP EESR, dated May 30, 2022 in corresponding EP Application 21216342.2.
EP EESR, dated May 30, 2022 in corresponding EP Application 21216332.3.
EP EESR, dated May 20, 2022 in corresponding EP Application 21216266.3.
EP EESR, dated May 20, 2022 in corresponding EP Application 21216339.8.
EP EESR, dated May 18, 2022 in corresponding EP Application 21216265.5.

* cited by examiner

| Motor | Stator Diameter (OD) | Electrical Length (EL) | Magnetic Length (ML) | Max Pout | Km Constant N.m/√W | Km per Magnetic Volume (N.m√W) / m^3 | Km per Electric Volume (N.m√W) / m^3 |
|---|---|---|---|---|---|---|---|
| Motor 100 (1 Coil/Tooth) | 51 mm | 40 mm | 36.4 mm | 1840 Watts | 0.0762 | 1024 | 933 |
| Motor 100 (2 Coil/Tooth) | 51 mm | 40 mm | 36.4 mm | 1895 Watts | 0.0804 | 1081 | 984 |
| Motor 100 (3 Coil/Tooth) | 51 mm | 40 mm | 36.4 mm | 1922 Watts | 0.0826 | 1111 | 1012 |
| Motor 100 (4 Coil/Tooth) | 51 mm | 40 mm | 36.4 mm | 1950 Watts | 0.0851 | 1143 | 1042 |
| Conventional Example 1 | 51 mm | 40 mm | 36.4 mm | 1016 Watts | 0.0471 | 633 | 576 |
| Conventional Example 2 | 40 mm | 65 mm | 59.2 mm | 1507 Watts | 0.0638 | 855 | 778 |
| Conventional Example 3 | 61 mm | 28 mm | 25.5 mm | 1057 Watts | 0.0623 | 838 | 763 |

FIG. 21

BRUSHLESS DC MOTOR HAVING HIGH POWER DENSITY FOR POWER TOOL

RELATED APPLICATION

This patent application claims the benefit of U.S. Provisional Application No. 63/129,797 filed Dec. 23, 2020, which incorporated herein by reference in its entirety.

FIELD

This disclosure relates to a brushless motor assembly for a rotary tool, and particularly to a brushless motor assembly with high power density.

SUMMARY

According to an embodiment of the invention, a power tool is provided including a housing and a brushless direct-current (BLDC) motor disposed within the housing.

In an embodiment, the motor includes a rotor assembly including rotor shaft extending along a longitudinal axis and a rotor supporting magnets mounted on the rotor shaft; and a stator assembly including a stator comprising a stator core and stator teeth radially extending from the stator core and defining slots therebetween, and stator windings wound on the stator teeth. In an embodiment, a circuit board is disposed adjacent a rear end of the stator assembly and including conductive traces facilitating a one of a delta or a series connection between the stator windings.

In an embodiment, a ratio of a motor size (Km) constant of the motor to a magnetic envelope of the motor is greater than approximately 900 (N·m/√W)/m^3, where the electrical envelope of the motor is radially bound by an outer cylindrical boundary of the stator assembly and axially bound by a front radial plane located at a frontmost point of the stator windings and a rear radial plane located at a rearmost point of the circuit board.

In an alternative embodiment, a ratio of a motor size (Km) constant of the motor to an electric envelope of the motor is greater than approximately 810 (N·m/√W)/m^3, where the magnetic envelope of the motor is radially bound by an outer cylindrical boundary of the stator assembly and axially bound by a frontmost and rearmost ends of the stator windings.

In an embodiment, the motor is configured to output a maximum power output of at least greater than or equal to approximately 1840 watts.

In an embodiment, the stator assembly has an outer diameter in the range of 40 mm to 60 mm.

In an embodiment, stator windings include a first plurality of stator windings wound on the stator teeth, and a second plurality of stator windings wound on the stator teeth such that, on each stator tooth, one of the first windings is provided in parallel to one of the second stator windings.

In an embodiment, the stator assembly includes stator terminals provide between respective stator teeth in the circumferential direction of the stator. The circuit board is physically coupled to the stator terminals to electrically connect the stator windings.

In an embodiment, the stator has an inner diameter defined by inner ends of the stator teeth and an outer diameter defined by an outer surface of the stator core, a ratio of the inner diameter to the outer diameter being in the range of 0.5 to 0.53.

In an embodiment, the stator core has a variable thickness and, for each of the slots, includes a first portion forming an approximately right angle with the respective stator tooth and a second portion that is substantially normal to a radius of the stator assembly and forms an angle of approximately 25 to 35 degrees with the first portion.

In an embodiment, an axial length of the electrical envelope is less than or equal to approximately 40 mm.

In an embodiment, an axial length of the magnetic envelope is less than or equal to approximately 36.4 mm.

BRIEF DESCRIPTION OF THE DRAWINGS

FIG. 21 depicts a table summarizing the motor performance characteristics in comparison to examples of comparable conventional motors, according to an embodiment.

DETAILED DESCRIPTION

Figure 1:
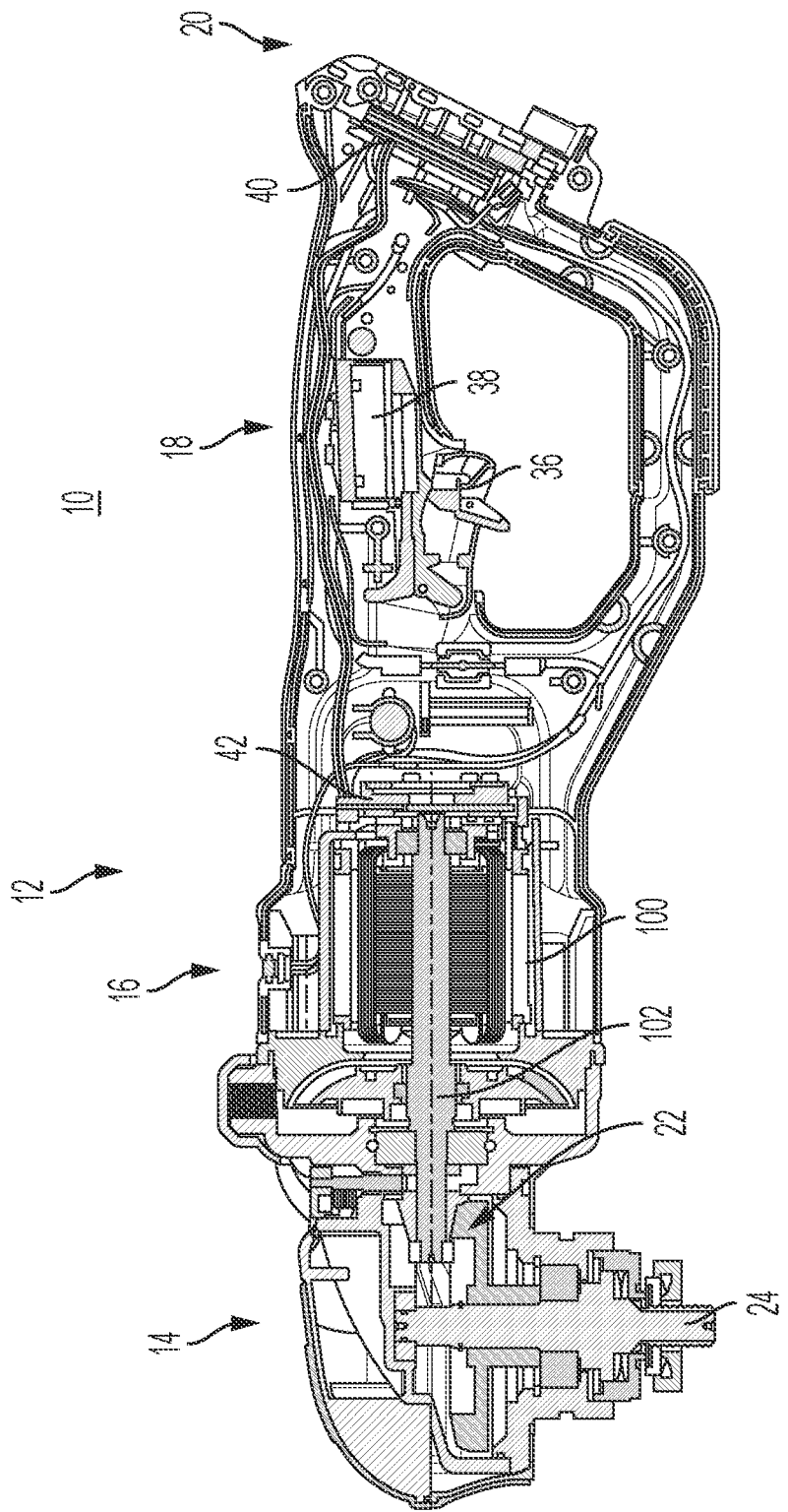
FIG. 1 is a side cross-sectional view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 is a side cross-sectional view of a power tool 10, according to an embodiment. In an embodiment, power tool 10 is provided including a housing 12 having a gear case 14, a motor case 16, a handle portion 18, and a battery receiver 20. Power tool 10 as shown herein is an angle grinder with the gear case 14 housing a gearset 22 that drives an output spindle 24 arranged to be coupled to a grinding, sanding, or cutting disc (not shown, herein referred to as "accessory wheel"). It should be understood, however, that the teachings of this disclosure may apply to any other power tool including, but not limited to, a saw, drill, sander, impact driver, hammer drill, cutting tool, polisher, and the like. Gearset 22 may operate the output spindle 24 at a 90-degree angle orientation or in a linear orientation.

In an embodiment, the motor case 16 attaches to a rear end of the gear case 14 and houses a motor 100 operatively connected to the gear set 22. In an embodiment, the motor 28 is a brushless direct-current (BLDC) motor that rotatably drives a rotor shaft 102, which in turn rotatably drives the output spindle 24 via the gearset 22.

In an embodiment, the handle portion 18 extends from a rear end of the motor case 16 and includes a trigger assembly 36 operatively connected to a switch module 38 disposed within the handle portion 18, which is in turn coupled to a control module 40 disposed close to the battery receiver 20 for controlling the battery discharge and the operation of the motor 100. The battery receiver 20 is provided at a rear end of the handle portion 18 for detachable engagement with a battery pack (not shown) to provide power to the motor 100.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the control module 40 is electronically coupled to a power module 42 provided in this embodiment adjacent the motor 100 to control flow of electric power to the motor 100. Power module 42 may alternatively be provided as a part of the same package as the control module 40 or disposed at a different location of the power tool. In an embodiment, the power module 42 includes six power switches (e.g., FETs or IGBTs) configured as a three-phase inverter switch. The control module 40 controls a switching operation of the power module 42 to regulate a supply of power from the battery pack to the motor 100. The control module 40 uses the input from the switch module 38 to set a target speed for the motor 100. When the trigger assembly 36 is released, in an embodiment, the control module 40 activates the low-side switches or the high-side switches of the power module 42 simultaneously for regenerative electronic braking of the motor. A description of the power and control modules and electronic braking of the motor can be found in US Patent Publication No. 2017/0234484, filed Feb. 10, 2017, which is incorporated herein by reference in its entirety.

Figure 2:
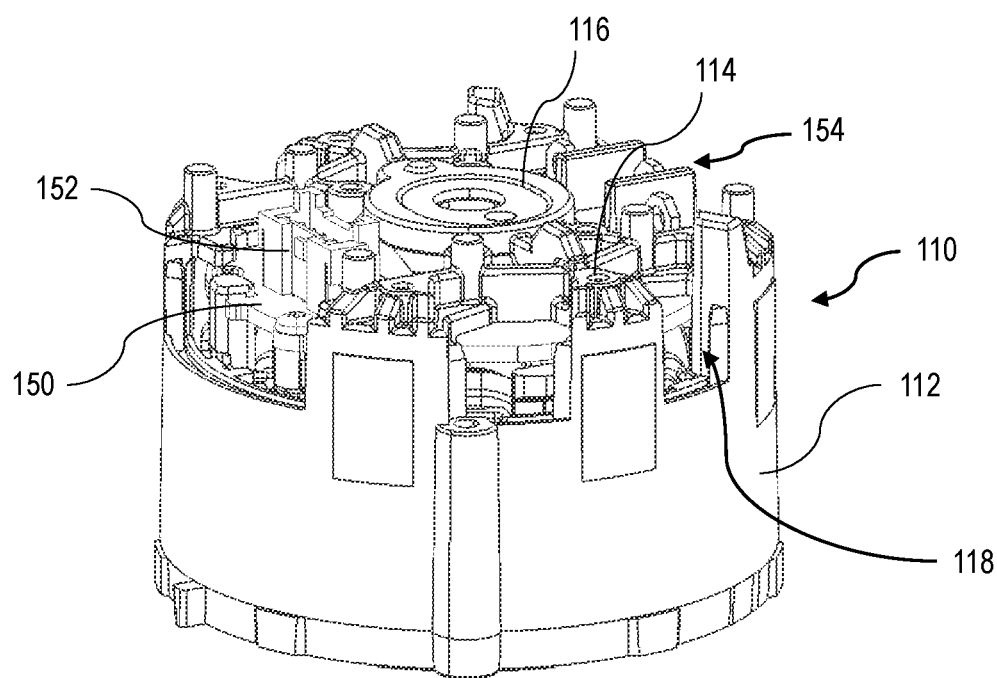
FIG. 2 depicts a perspective view of a motor provided within the power tool, according to an embodiment.
Figure 3:
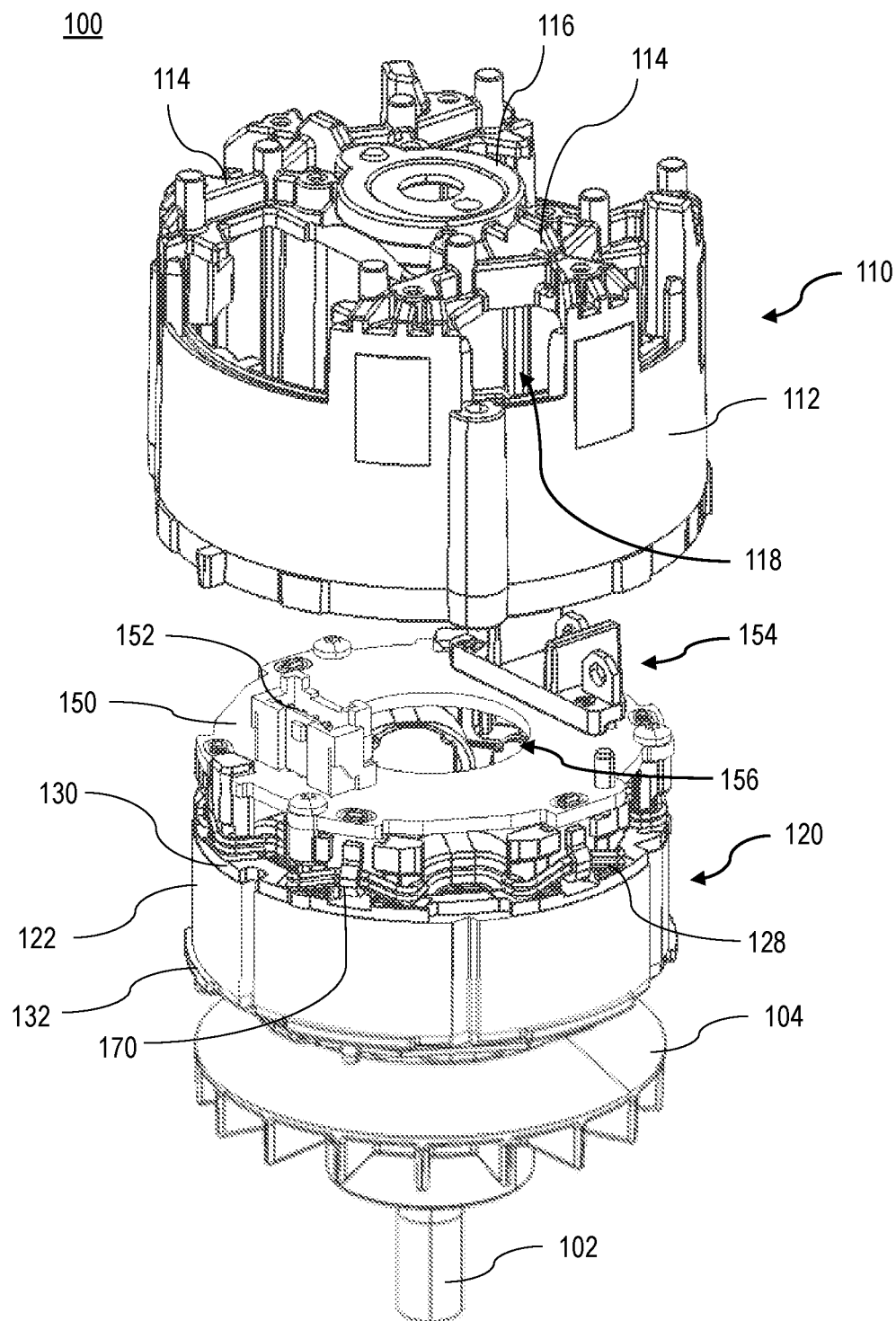
FIG. 3 depicts a perspective exploded view of the motor including a fan mounted on a rotor shaft adjacent the motor.
Figure 4:
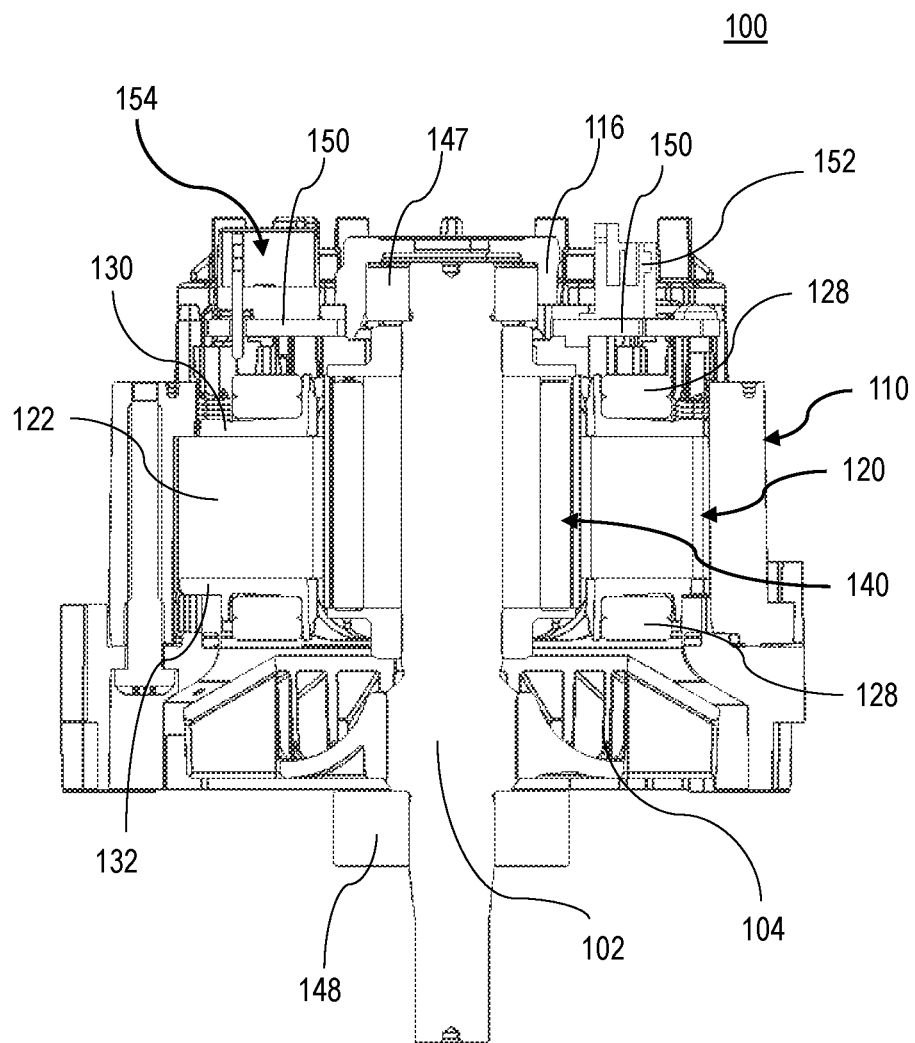
FIGS. 4 and 5 respectively depict a side cross-sectional view and a perspective cross-sectional view of the motor, according to an embodiment.
Figure 5:
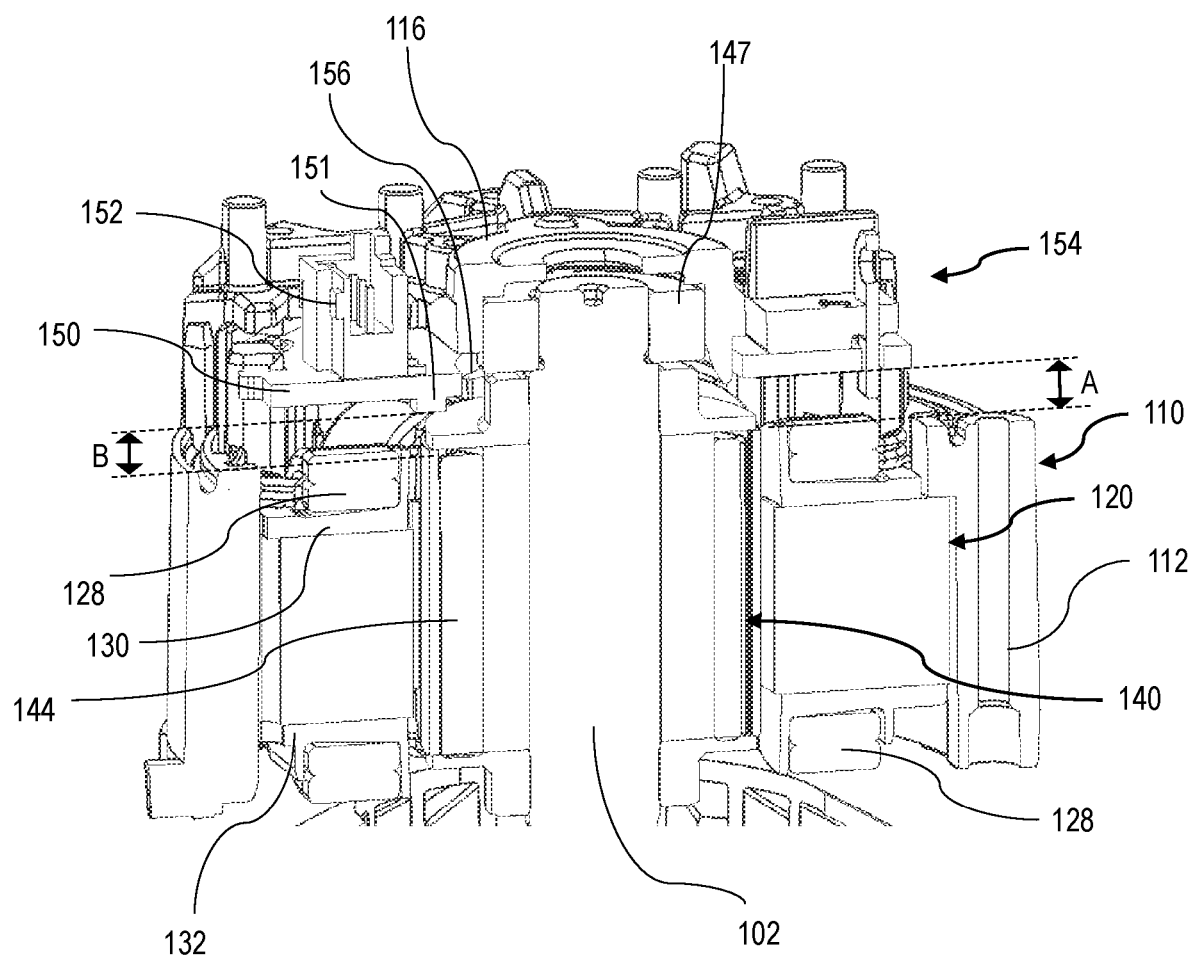

FIG. 2 depicts a perspective view of the motor 100, according to an embodiment. FIG. 3 depicts a perspective exploded view of the motor 100 including a fan 106 mounted on the rotor shaft 102 adjacent the motor 100. FIGS. 4 and 5 respectively depict a side cross-sectional view and a perspective cross-sectional view of the motor 100, according to an embodiment. The motor 100 is discussed in detail herein with reference to these figures.

In an embodiment, motor 100 includes a motor housing (or motor can) 110 configured and shaped to house and support the motor 100 components. In an embodiment, motor housing 110 includes a generally cylindrical body 112 that includes an open end for receiving the motor 100 components. On the other end of the body 112, a series of radial members 114 are formed. Radial members 114 extend towards from the body 112 towards a central bearing pocket 116. In this embodiment, radial members 114 include a series of openings therebetween, though radial members 114 may be alternatively with a primarily solid wall. In an embodiment, the body 112 further includes a series of air gaps 118 in conjunction with the openings. Air gaps 118 are formed between a series of legs 119 formed at the end of the body 112 adjoining the radial members 114.

In an embodiment, motor 100 further includes a stator assembly 120 and a rotor assembly 140. In an embodiment, stator assembly 120 is disposed outside the rotor assembly 140, though many principles of this disclosure may also apply to an outer-rotor motor. In an embodiment, motor 100 further includes a circuit board 150 secured to an end of the stator assembly 120 inside the motor housing 110. These features are described herein in detail.

Figure 6:
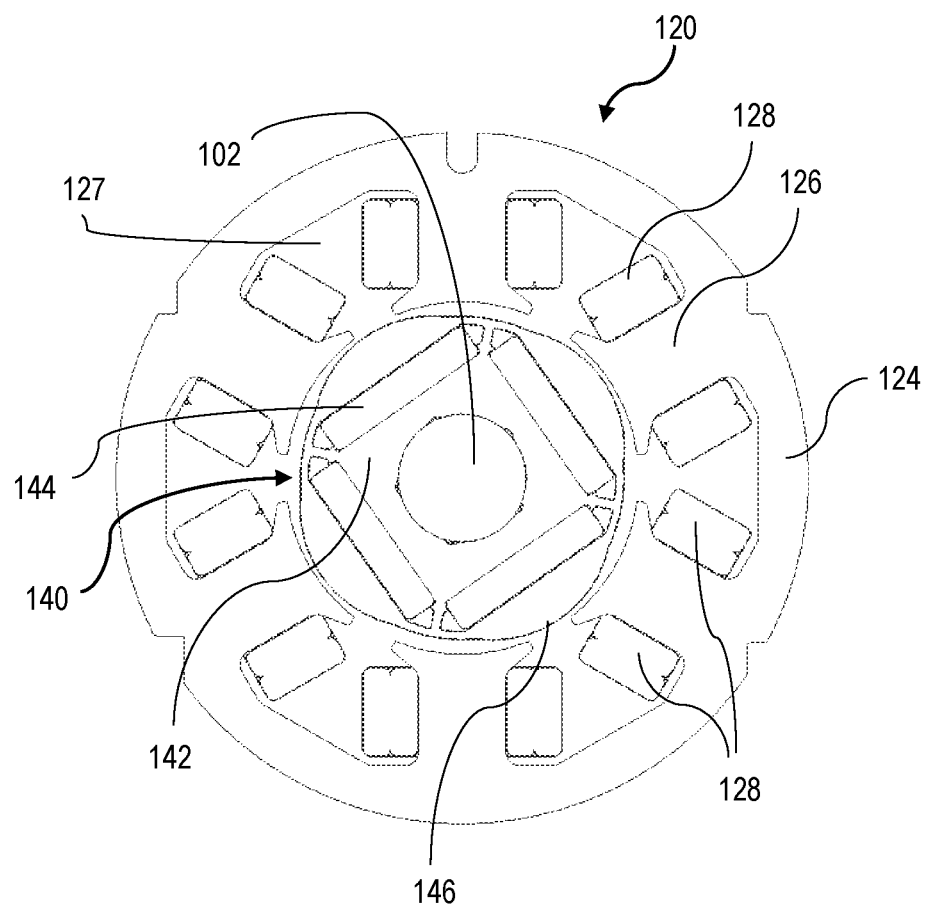
FIG. 6 depicts an axial cross-sectional view of stator assembly and rotor assembly of the motor, according to an embodiment.

FIG. 6 depicts an axial cross-sectional view of the stator assembly 120 and rotor assembly 140, according to an embodiment. Referring to this figure, and with continued reference to FIGS. 3 and 4, stator assembly 120, in an embodiment, includes a stator 122 that is preferably made up of a series of laminations. The outer diameter (OD) of the stator 122 is sized to be fixedly received within the body 112 of the motor housing 110. The stator 122 includes a stator core (or back-iron) 124 and a series of inwardly-projecting teeth 126 around which a series of stator windings 128 are wound. Specifically, stator teeth 126 form a series of slots 127 in between, and stator windings 128 are wound inside the slots 127 around the respective stator teeth 126. The number of stator teeth 126 and stator windings 128 may corresponding to the number of electronically commutated phases of the motor 100. In an embodiment, where motor 100 is a three-phase motor, six teeth 126 and six sets of windings 128 may be provided.

In an embodiment, rotor assembly 140 includes a rotor 142 that is preferably made up on a series of laminations mounted on the rotor shaft 102 and disposed within the stator assembly 140. In an embodiment, a series of discrete permanent magnets 144 are embedded within the rotor 142 in a N-S-N-S orientation extending along a longitudinal axis of the rotor shaft 102. The magnetic interface between the magnets 144 and the stator windings 128, as phases of the motor 100 are sequentially energized, cause rotation of the rotor assembly 140 within the stator assembly 120. In an embodiment, rotor 142 includes a series of humped surfaces 146 in-line with centers of the permanent magnets 144 for noise and vibration reduction.

Referring back to FIGS. 2 and 3, in an embodiment, air gaps 118 of the motor housing 110, together with the circuit board 150, form apertures around the stator assembly 120, allowing entry of ambient air into the motor 100 to cool the motor components. In an embodiment, air gaps 118 of the motor housing 110 are substantially aligned with the stator windings 128 and legs 119 of the motor housing 110 are substantially aligned with the stator terminals 170 to cover the stator terminals 170.

Referring back to FIGS. 4 and 5, in an embodiment, rear end insulator 130 and front end insulator 132 are disposed on axial ends of the stator 122 to provide electrical insulation between the stator windings 128 and the stator 122. In an embodiment, the rear and front end insulators 130 and 130 include similar profiles (i.e., core, teeth and slots) as the stator 122 when viewed longitudinally and are mounted on the axial ends of the stator 122 prior to the winding process. In an embodiment, as discussed later below, rear end insulator 130 further includes features for supporting a series of stator terminals 170 in the direction of the circuit board 150.

In an embodiment, rear and front rotor bearings 147 and 148 are mounted on the rotor shaft 102, in this example on opposite sides of the rotor 142, to provide radial and/or axial support for the rotor assembly 140 relative to the power tool 10, the motor housing 110, and/or stator assembly 120. In the illustrated example, the rear bearing 147 is received within bearing pocket 116 of the motor housing 110 and front bearing 148 is supported via a wall or support structure of the tool housing 12. The rear and front rotor bearings 147 and 148 maintain a small airgap round the rotor 142 relative to the stator 122 to allow rotation of the rotor 142 within the stator 122 while maintaining radial and axial structural support for the rotor assembly 140. In an embodiment, central opening 156 of the circuit board 150 has a greater diameter than the rear rotor bearing 147 so the rear rotor bearing 147 can be passed through the central opening 156 and securely received within the bearing pocket 116 during the assembly process.

Figure 7:
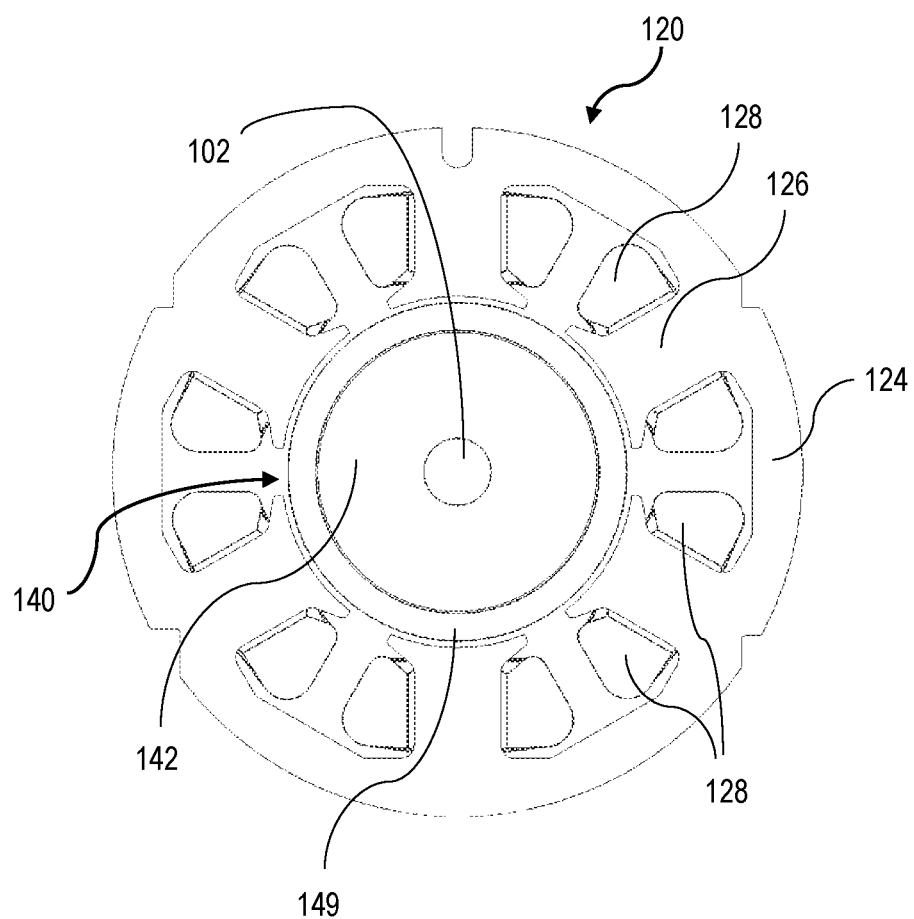
FIG. 7 depicts an axial cross-sectional view of the stator assembly and rotor assembly, according to an alternative embodiment.

FIG. 7 depicts an axial cross-sectional view of the stator assembly 120 and rotor assembly 140, according to an alternative embodiment. In this embodiment, a permanent magnet ring 149 is surface mounted on the rotor 142. Magnet ring 149 is either includes four magnet segments each extending 90 degrees of angular distance and adjoining at a N-S-N-S orientation. In an embodiment, this orientation reduces magnetic flux leakage and increases the power output density of the motor in comparison to the embedded rotor magnet design of FIG. 6.

Figure 8:
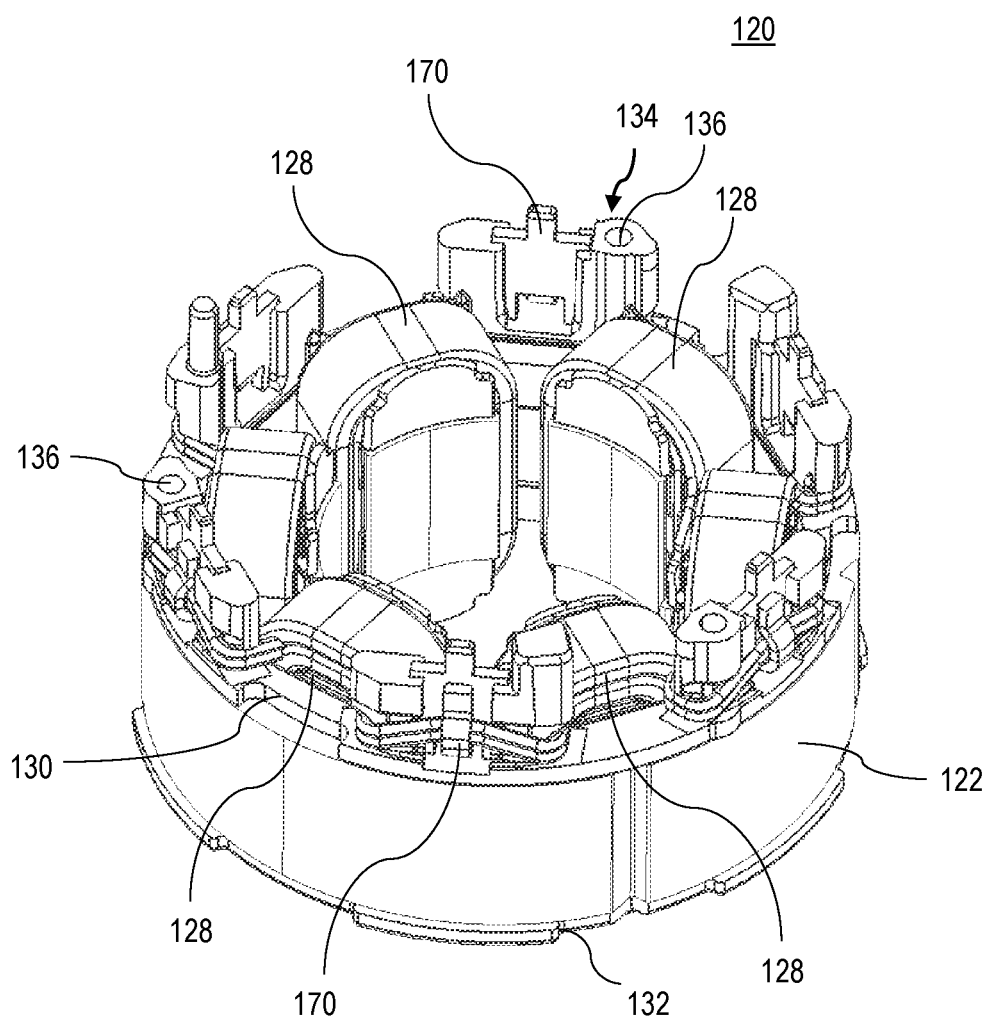
FIG. 8 depicts a perspective view of the stator assembly alone without the circuit board, according to an embodiment.
Figure 9:
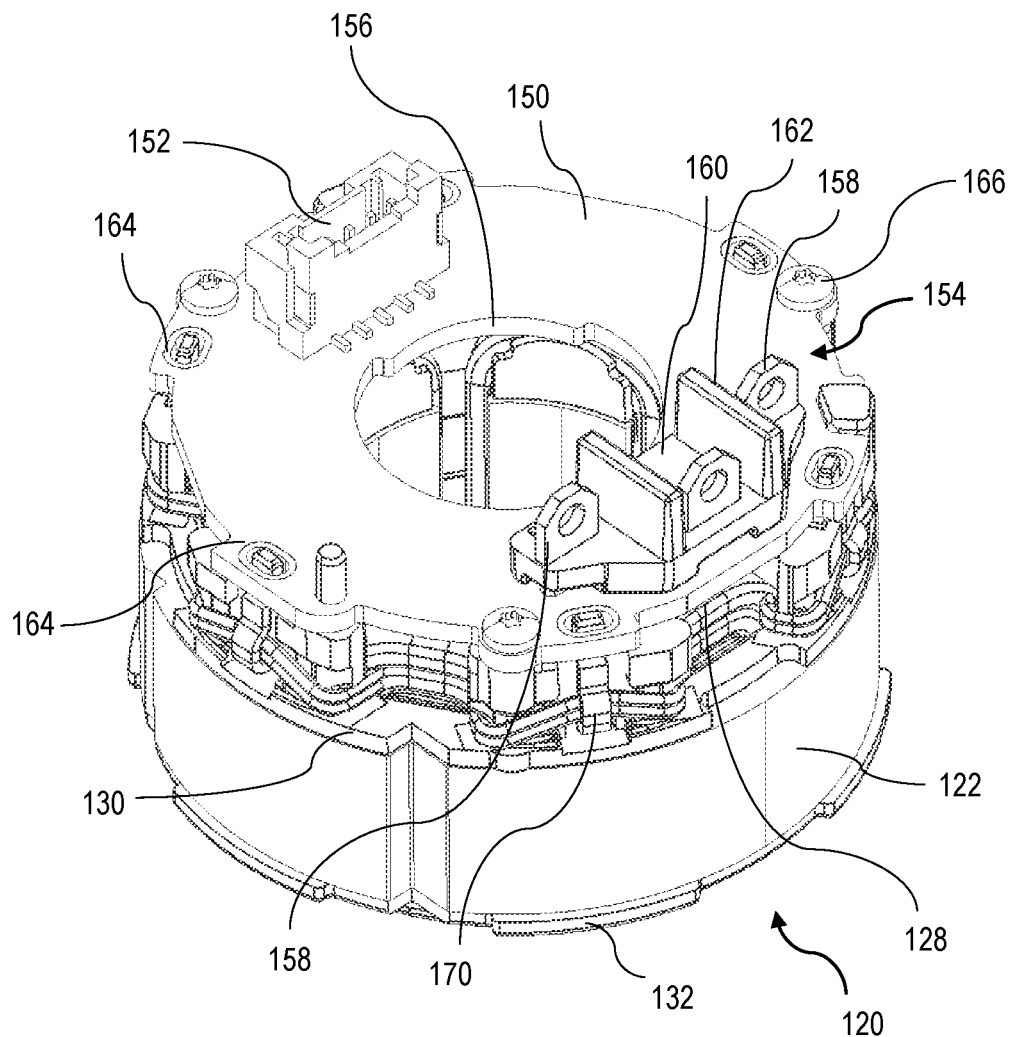
FIG. 9 depicts a perspective view of the stator assembly with the circuit board mounted thereon, according to an embodiment.
Figure 10:
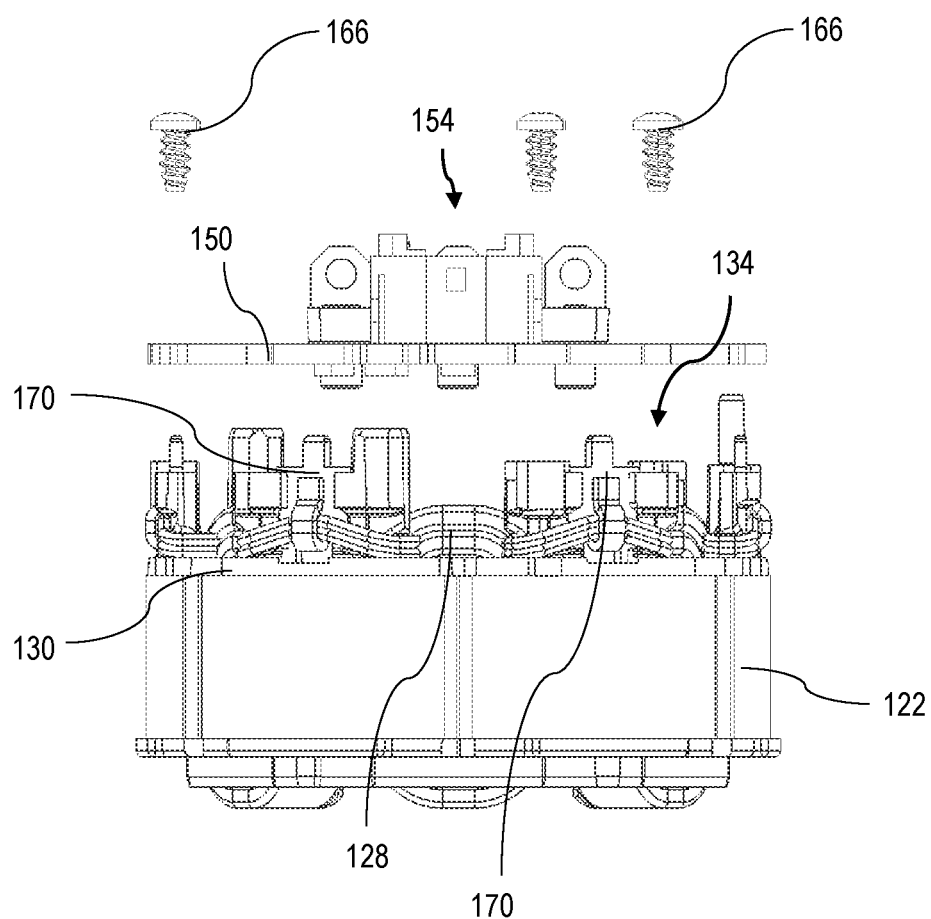
FIG. 10 depicts a side partially exploded view of the stator assembly and the circuit board, according to an embodiment.

FIG. 8 depicts a perspective view of the stator assembly 120 alone without the circuit board 150, according to an embodiment. FIG. 9 depicts a perspective view of the stator assembly 120 with the circuit board 150 mounted thereon, according to an embodiment. FIG. 10 depicts a side partially exploded view of the stator assembly 120 and the circuit board 150, according to an embodiment. Circuit board 150 and its mounting to the stator assembly 120 is described herein in detail with reference these figures and continued reference to FIGS. 3-5.

In an embodiment, circuit board 150 (herein also referred to as Hall board) is provided inside the motor housing 110 adjacent the axial end of the stator assembly 120 and sandwiched between the stator 120 and the radial members 114 of the motor housing 110. In an embodiment, circuit board 150 is disc-shaped including a central opening 156 through which the rotor shaft 102 extends for piloting into the central bearing pocket 116 of the motor housing 110.

In an embodiment, circuit board 150 includes one or more magnetic (Hall) sensors 151 that interact with the rotor assembly 140. Signals from the Hall sensors 151 are used to detect the angular position of the rotor assembly 140. In an embodiment, Hall sensors 151 are positioned in sufficiently close proximity to the rotor magnets to directly sense the angular position of the rotor 142 by sensing the magnetic flux of the rotor magnets. Alternatively, in an embodiment, an additional sense magnet ring (not shown) may be disposed on the rotor shaft 102 adjacent he rotor 102 in close proximity to the Hall sensors 151. Additionally, in an embodiment, circuit board 150 includes conductive traces to connect the stator windings 128 in a series and/or parallel and delta and/or wye configuration.

In an embodiment, circuit board 150 includes a series of openings 164 arranged close to the outer circumference arranged to receive ends of stator terminals 170. Stator terminals 170, as described later in detail, are mounted on the rear end insulator 130 of the stator assembly 120 between the respective stator windings 128 and connect to a front surface of the circuit board 150 (facing the stator assembly 120) to electrically connect the stator windings 128 to the conductive traces of the circuit board 150. In an embodiment, openings 164 are conductive vias to facilitate electrical connection between the stator terminals 170 and the metal traces and routings.

In an embodiment, circuit board 150 further includes a control terminal block 152 that includes a ribbon connector for communicating with the control module 40. The control terminal block 152 includes at least three signals from the Hall sensors 151. The circuit board 15 further includes a power terminal block 154 for providing power from the power module 42 to the stator windings 128. In an embodiment, control terminal block 152 and power terminal block 154 are mounted on a rear surface of the circuit board 150 (facing away from the stator assembly 120) on opposite sides of the central opening 156.

In an embodiment, as best shown in FIG. 9, power terminal block 154 includes a set of conductive terminals 158 (in this case three terminals corresponding to the three phases of the motor 100), each extending perpendicularly from the rear surface of the circuit board 150 and including an upper opening for soldering or weldment to a power wire (not shown). The power terminal block 154 further includes an insulating mount 160 that is mounted on the rear surface of the circuit board 150 and includes slots through which the conductive terminals 158 extend from the circuit board 150. The insulating mount 160 provides structural and insulative support for the conductive terminals 158, preventing them from being inadvertently bent and encounter one another. In an embodiment, the insulating mount 160 includes one or more walls 162 positioned between the adjacent conductive terminals 158 to ensure that contamination of the power terminal block 154 by metallic particulate does not create electrical shortage between the conductive terminals 158.

In an embodiment, rear end insulator 130 of the stator assembly 120 includes a series of axial support members 134 provided to support the stator terminals 170 in the axial direction of the motor 100. Each axial support member 134 includes two posts that form an opening in between for securely receiving and supporting one of the stator terminals 170. In an embodiment, six axial support members 134 support six stator terminals 170 between the respective sets of stator windings 128.

In an embodiment, two or more (in this example, three) of the axial support members 134 include threaded openings 136. The circuit board 150 is secured to the stator assembly 120 via a series of fasteners 166 received through corresponding openings of the circuit board 150 into the threaded openings 136 of the rear end insulator 130.

In an embodiment, referring to FIG. 5, axial support members 134 are sized to maintain a minimum distance A between the stator windings 128 and the circuit board 150, while ensuring that the Hall sensors 151 are maintained at a maximum distance B from the rotor permanent magnets 144 for direct-sensing of the permanent magnets 144, where A>=B. In an embodiment, distances A and B both fall in the range of 1 to 6 mm.

In an embodiment, referring to FIGS. 2 and 3, radial members 114 of the motor housing 110 are disposed in contact with the rear surface of the circuit board 150, with control and power terminals blocks 152 and 154 being received through the openings between the radial members 114 to be accessible for coupling with electrical connectors and wires outside the motor housing 110. In an embodiment, routing the stator windings 128 on the same circuit board 150 as the Hall sensors 156, and placement of the circuit board 150 inside the motor housing 100, significantly reduces the overall size of the motor 100 assembly, thus increasing the power output density of the motor 100.

In an embodiment, as stated above, control and power terminal blocks 152 and 154 of the circuit board 150 are received between radial members 114 of motor housing 110 to facilitate coupling with control and power cords received from the control and power modules 40 and 42 of the power tool 10. As such, in an embodiment, as best seen in FIG. 4, at least one radial plane exists that intersects the rear bearing 147 of the rotor shaft 102, the radial members 114 of motor housing 110, and control and power terminals blocks 152 and 154 of the circuit board 150.

In an embodiment, as stated above, circuit board 150 includes conductive traces to connect the stator windings 128 in a series and/or parallel and delta and/or wye configuration. In order to maximize the surface areas of the conductive traces in the circuit board 150, according to an embodiment, circuit board 150 is multi-layered printed circuit board, as described here with reference to FIGS. 11A through 11D.

Figure 11A:
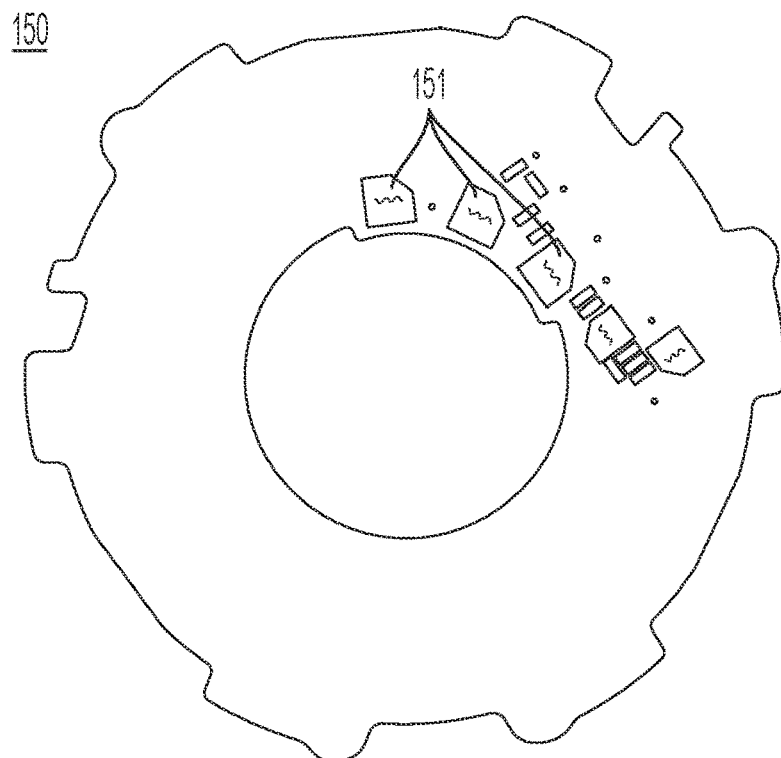
FIGS. 11A through 11D depict various layers of the multi-layers circuit board, according to an embodiment.
Figure 11B:
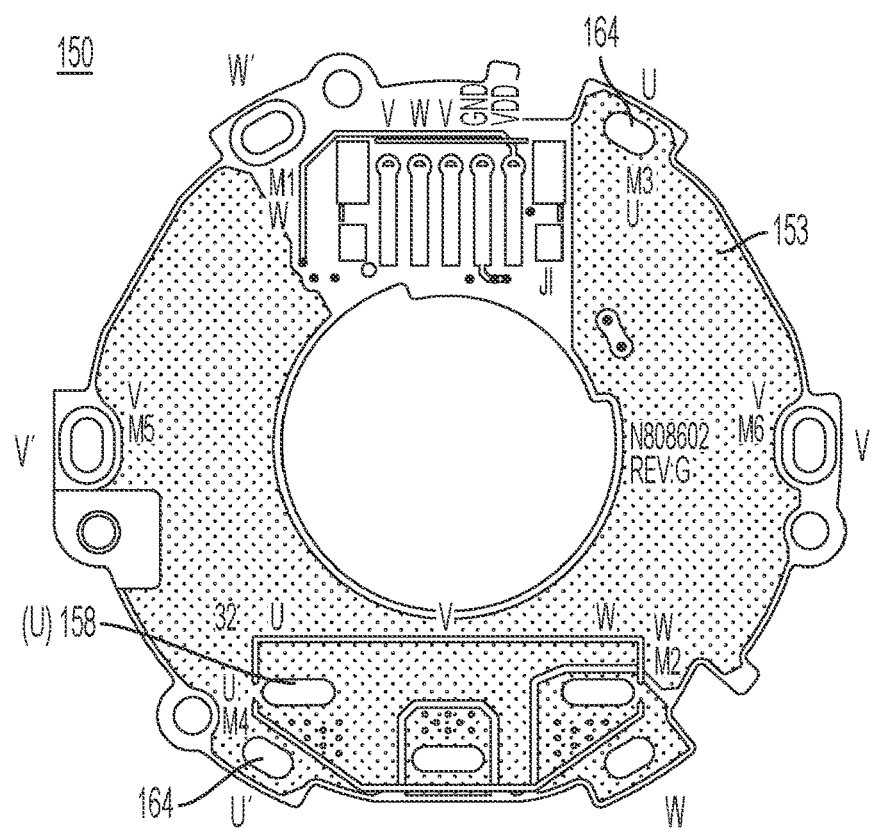
Figure 11C:
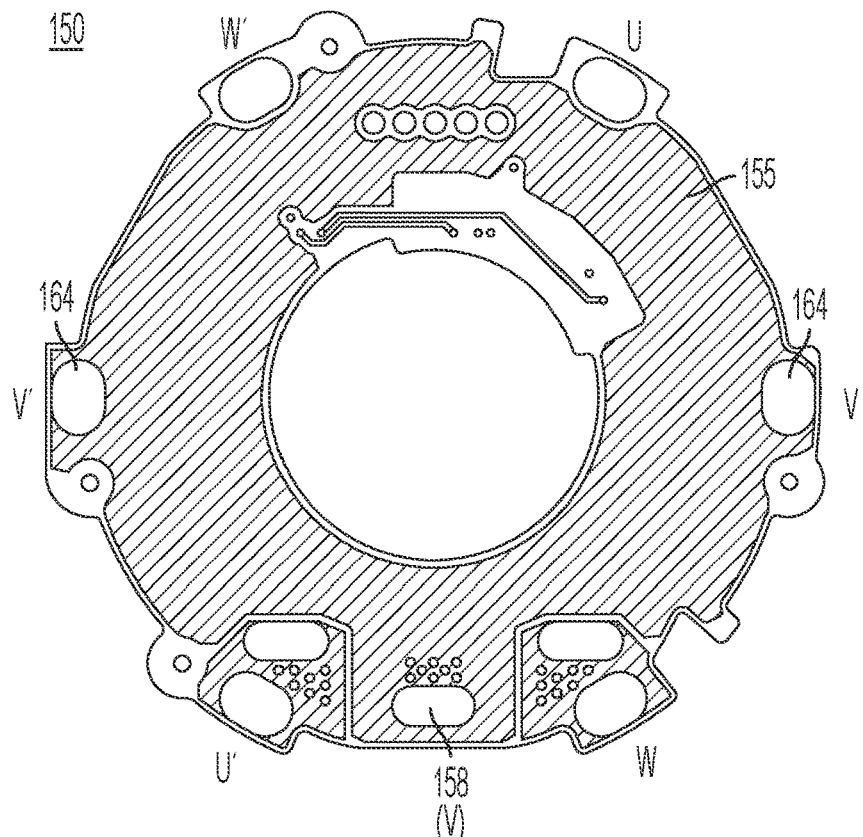
Figure 11D:
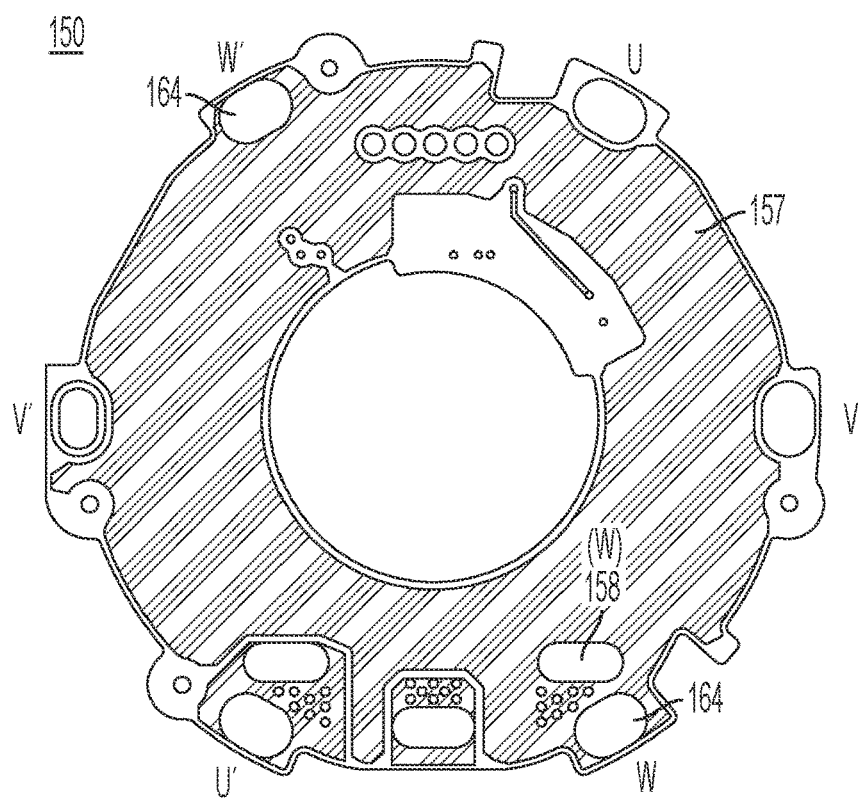

FIGS. 11A through 11D depict various layers of the multi-layers circuit board 150, according to an embodiment. In an embodiment, as shown in FIG. 11A, Hall sensors 151 are mounted on a front surface of the circuit board 150. In an embodiment, as shown in FIGS. 11B-11D, conductive trace 153 (electrically connecting U and U' terminals), conductive trace 155 (electrically connecting V and V' terminals), and conductive trace 157 (electrically connecting W and W' terminals), are disposed on various inner layers of the circuit board 150. In an embodiment, each of the conductive routings 153, 155 and 157 occupies approximately 90% or more of the total surface area of the circuit board 150, thus reducing heat and resistance associated with the conductive traces.

Figure 12:
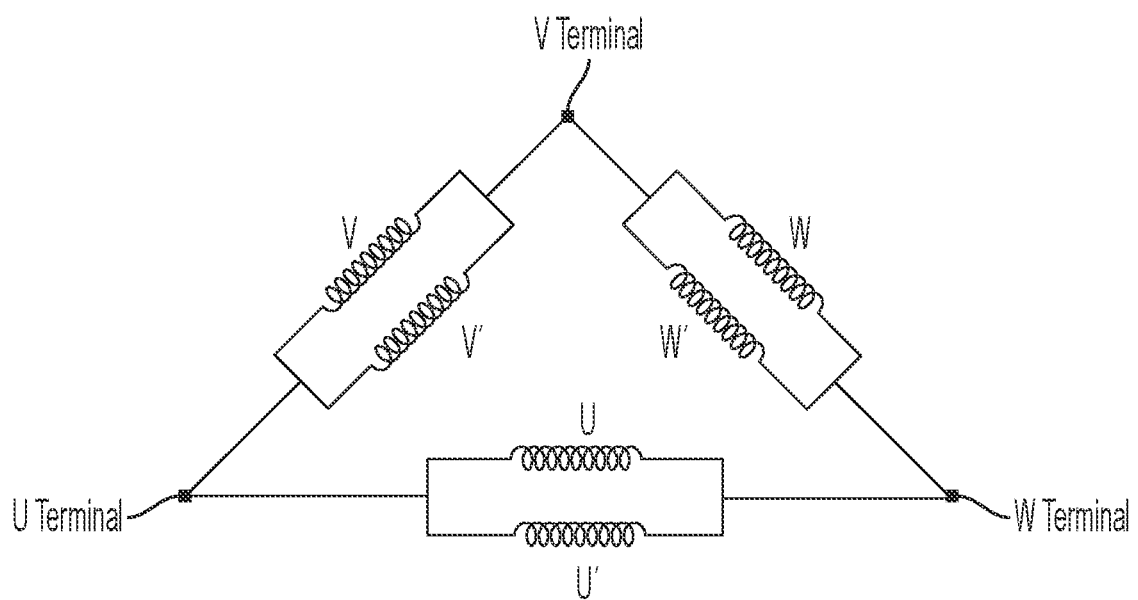
FIG. 12 depicts a circuit diagram of a parallel-delta configuration between the phases of the motor, according to an embodiment.

In an embodiment, conductive traces 153, 155 and 157 are respectively connected to U, V and W conductive terminals 158. As shown in the circuit diagram of FIG. 12, this arrangement facilitates a parallel between the windings of the same phase and a delta connection between pairs of windings of different phases, according to an embodiment.

Figure 13:
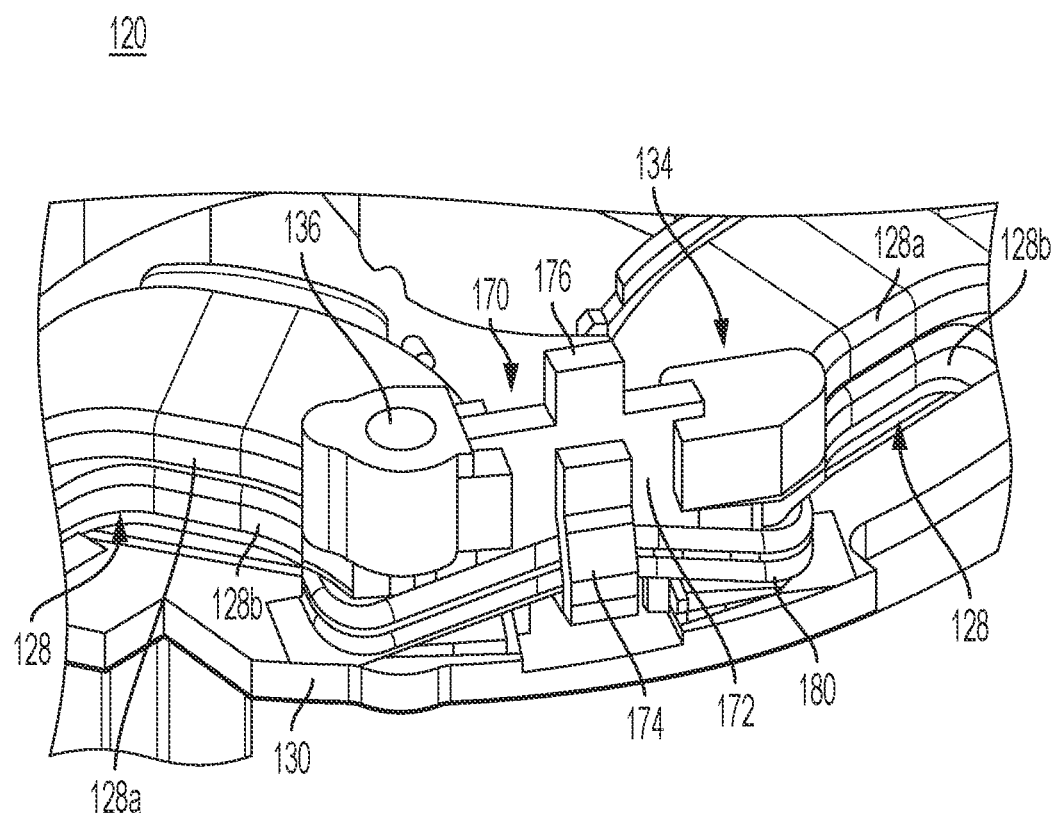
FIG. 13 depicts a partial perspective view of the stator assembly focusing on a single stator terminal disposed between two stator windings, according to an embodiment.

FIG. 13 depicts a partial perspective view of the stator assembly 120 focusing on a single stator terminal 170 disposed between two stator windings 128. As shown here, and with continued reference to FIGS. 8-10, stator terminal 170 includes a main portion 172 received between the posts of the axial support member 134 normal to the longitudinal axis of the motor 100. Main portion 172 may be planar or include one or more arcuate segments having a similar curvature as the stator 122. A first end of the main portion 172 (away from the circuit board 150) includes a tang portion 174 that is folded over the outer surface of the main portion 172. One or more cross-over wire portions 180 connecting the adjacent stator windings 128 located on two sides of the stator terminal 170 are passed through the gap between the tang portion 174 and the main portion 172 before the tang portion 174 is pressed against the main portion 172. A second end of the main portion 172 (closer to the circuit board 150) includes a pin 176 that is received within the corresponding peripheral opening 164 of the circuit board 150.

In an embodiment, start and finish ends of each of the stator windings 128 are electrically coupled to its two adjacent stator terminal 170, and as discussed below in detail, connections between opposing stator windings 128 of the same phase in a series of parallel connection, as well as connections between stator windings 128 of different phases in a wye or delta configuration, are facilitated via metal routings and/or traces on the circuit board 150. This arrangement eliminates the need for excessive routing of cross-over wire portions 180 that connect the stator windings 128 on the stator assembly 120.

In an embodiment, all stator windings 128 and cross-over wire portions 180 may be wound on the stator 122 using a single continuous magnet wire. The single continuous magnet wire is wound fully for a designated number of turns on one stator tooth 126, passed through the tang portion 174 of an adjacent stator terminal 170, wound fully on the adjacent stator tooth 126 for the designated number of turns, passed through a subsequent tang portion 174, and this process is continued until all stator windings 128 are fully wound with the designated number of turns. The two ends of the magnet wire may be wrapped around the tang portion 174 of the same stator terminal 170.

In an embodiment, using a smaller diameter magnet wire increases the overall slot fill and wire density within each slot. For example, winding the stator slots fully using a 19 AWG (American Wire Gauge) magnet wire (i.e., a 0.91 mm conductor diameter) may yield only a 51.14% slot fill per unit of area, because the large diameter of the magnet wire results in a less efficient overlay of the wires and larger airgaps between the wires. By contrast, winding the stator slots fully using a 21.5 AWG magnet wire (i.e., a 0.68 mm conductor diameter) yields a 58.61% slot fill. Similarly, winding the stator slots using a 23 AWG magnet wire (i.e., a 0.57 mm conductor diameter) yields a 62.98% slot fill. Increasing slot fill and wire density results in a reduction in the electrical resistance of the motor.

It is well understood that the number of turns of stator windings 128 on each tooth 126 is correlated to the desired torque output of the motor. The more number of turns of the stator windings, the higher the torque output of the motor. According, in order to increase slot fill and reduce electrical resistance of the motor while maintaining the desired number of turns of the stator windings 128 on each tooth 126, in an embodiment of the invention, two or more sets of stator windings having relatively smaller diameters are provided on each tooth and wound in parallel, as described herein in detail.

In an embodiment, as best seen in FIG. 13, two or more sets of stator windings 128a and 128b may be wound in parallel on each stator tooth 126, with two or more cross-over wire portions 180 passes between the adjacent stator windings 128a and adjacent stator windings 128b. In an embodiment, a first layer of stator windings 128a is initially wound on all stator teeth 126 as described above, and a second layer of stator windings 128b is wound on the same stator teeth 126 and in the same sequence on top of stator windings 128a to create a parallel connection between the respective stator windings 128a and 128 on each stator tooth 126. This may be accomplished using two separate continuous magnet wires, where a first magnet wire is wound on all stator teeth 126 as described above in a first step to provide stator windings 128a, and a second magnet wire is wound on top of the first magnet wire on all stator teeth 126 in a second step to provide stator windings 128b. Alternatively, the first and second sets of stator windings 128a and 128b may be wound from the same continuous magnet wire.

Figure 14A:
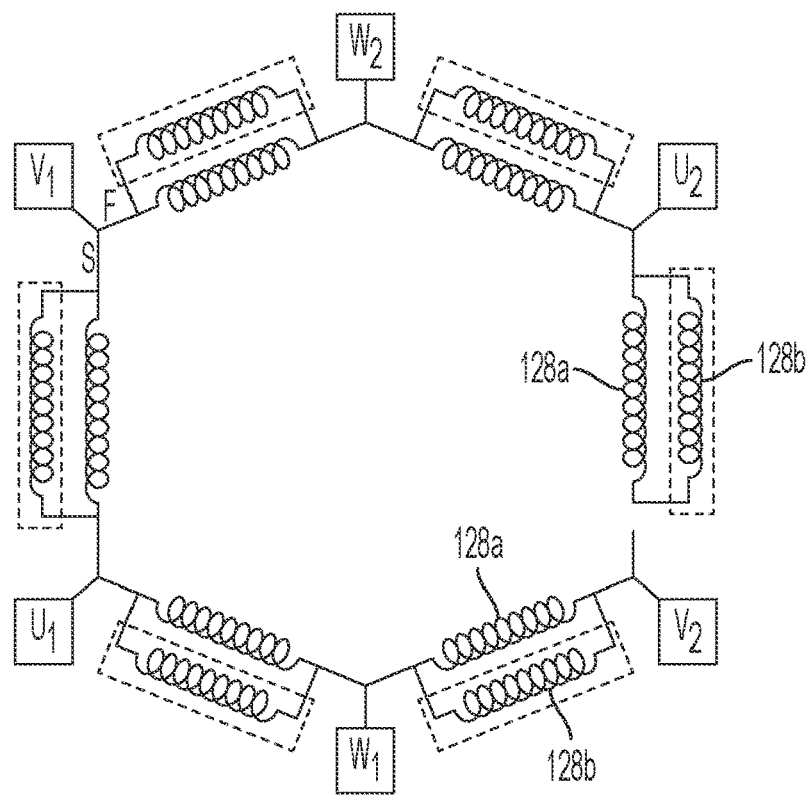
FIG. 14A depicts a simple circuit diagram of the parallel sets of stator windings, according to an embodiment.
Figure 14B:
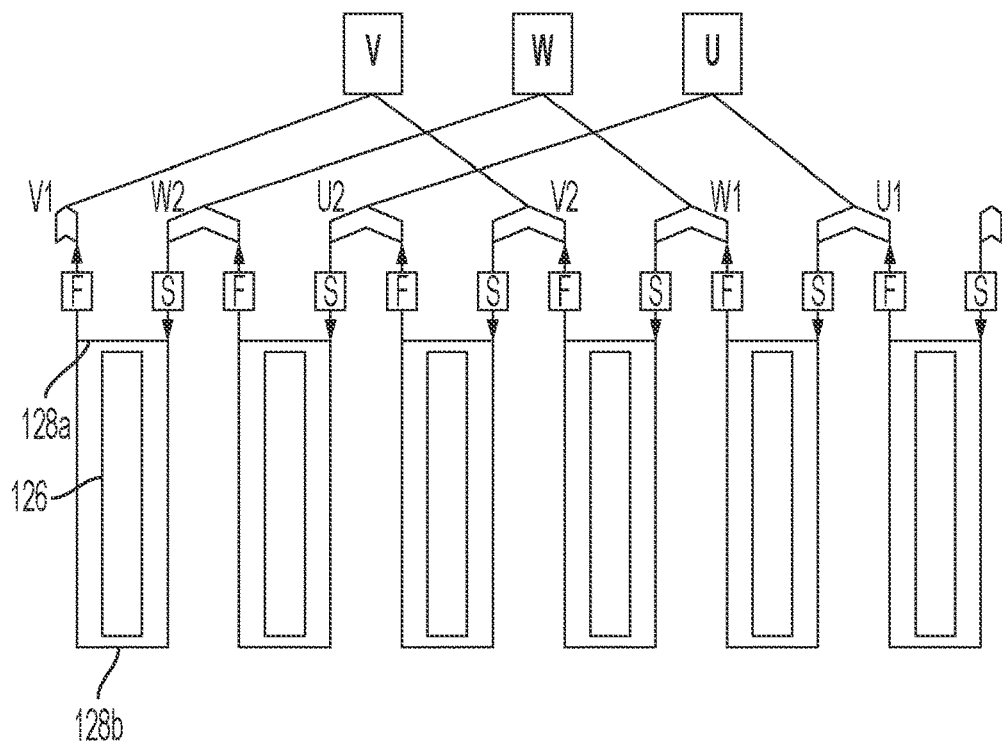
FIG. 14B depicts a simple winding diagram of the parallel sets of stator windings, according to an embodiment.

FIG. 14A depicts a simple circuit diagram of the parallel sets of stator windings 128a and 128b described above, according to an embodiment. FIG. 14B depicts a simple winding diagram of the parallel sets of stator windings 128a and 128b described above, according to an embodiment. It is noted that while these figures relate to an arrangement of two sets of stator windings per tooth, a higher number of parallel sets of stator windings may be utilized.

This arrangement increases slot fill and reduce electrical resistance of a motor for a given desired number of turns of the stator windings as required by the rated torque output of the motor. For example, in a motor where 19 number of turns of the stator windings is required to achieve a desired torque rating, two sets of stator windings 128a and 128b may be wound on each stator tooth 126 as described above, each at 19 number of turns and using a 21.5 AWG magnet wires. The parallel configuration of the 21.5 AWG stator windings 128a and 128 on each stator tooth 126 provides equivalent torque rating as a single set of stator windings using a 19 AWG magnet wire at 19 number of turns, but with a higher slot density and thus reduced electrical resistance.

Figure 15A:
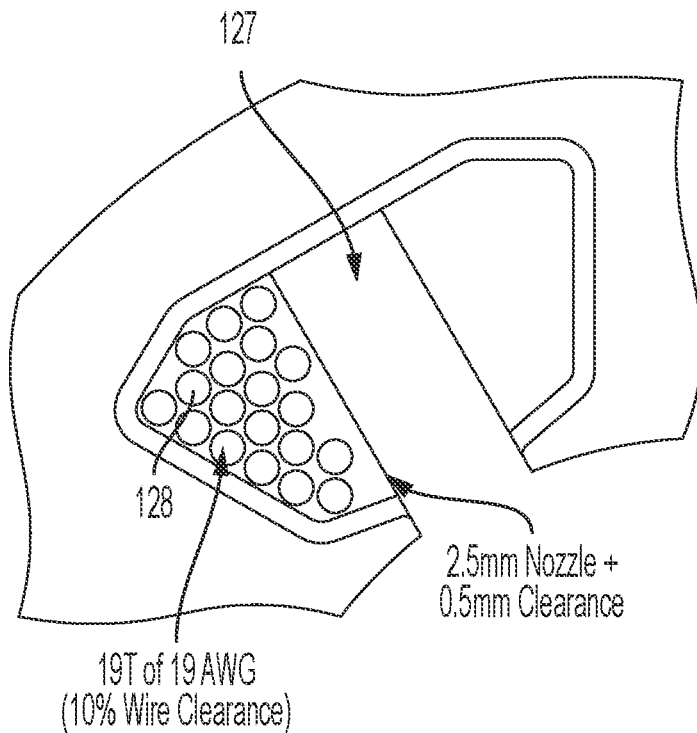
FIGS. 15A and 15B depict partial cross-sectional views of a stator slot in which stator windings are wound using 19 AWG and 21.5 AWG magnet wires respectively, according to an embodiment.
Figure 15B:
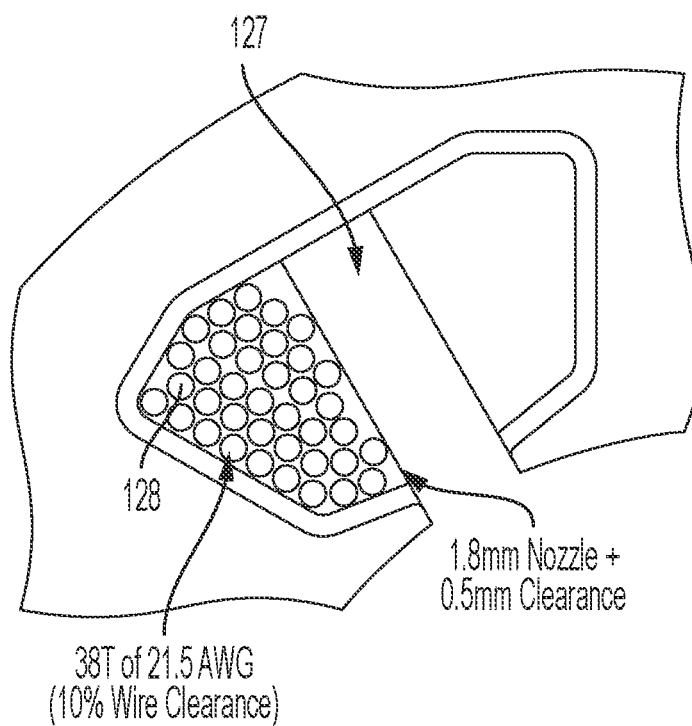

FIGS. 15A and 15B depict partial cross-sectional views of a stator slot 127 in which stator windings 128 are wound using 19 AWG and 21.5 AWG magnet wires respectively, according to an embodiment. Since cross-sectional area of a 19 AWG magnet wire is twice the cross-sectional area of 21.5 AWG magnet wire, as shown in these figures, 38 total turns of the 21.5 AWG magnet wires (wound as two sets of 19 turns in parallel) occupies substantially the same cross-sectional area of the stator slots 127 as does 19 turns of a 19 AWG magnet wire. Accordingly, the same torque rating is achieved, even though the parallel arrangement of the stator windings using two 21.5 AWG magnet wires increases slot fill by approximately 15%. Further, the parallel arrangement of the stator windings using two 21.5 AWG magnet wires reduces motor resistance by approximately 10%, improves power output by approximately 5%, and improves thermal efficiency of the motor by approximately 10%, as compared to a single set of 19 AWG magnet wire.

Similarly, in an embodiment, three sets of stator windings may be wound in parallel using 23 AWG magnet wires to further improve slot fill, reduce motor resistance, improve power output, and improve thermal efficiency of the motor. Table 1 below summarizes these findings.

TABLE 1

| Coil Per Tooth | Wire Gauge | Wire Size | Resistance | Slot Fill |
| --- | --- | --- | --- | --- |
| 1 | 19 AWG | 0.91 mm | 10.22 mOhms | 51.14% |
| 2 | 21.5 AWG | 0.68 mm | 9.18 mOhms | 58.61% |
| 3 | 23 AWG | 0.57 mm | 8.707 mOhms | 62.98% |

In an embodiment, the diameter of the magnet wire used for the first set of stator windings 128a may be different from the diameter of the magnet wire used for the second set of stator windings. 128b. While this process may complicate the manufacturing process and require use of two winding machines for the same motor, it can provide an optimal slot fill. In yet another embodiment, the number of turns of the first set of stator windings 128a may be different from the number of turns of the second set of stator windings 128b.

Figure 16:
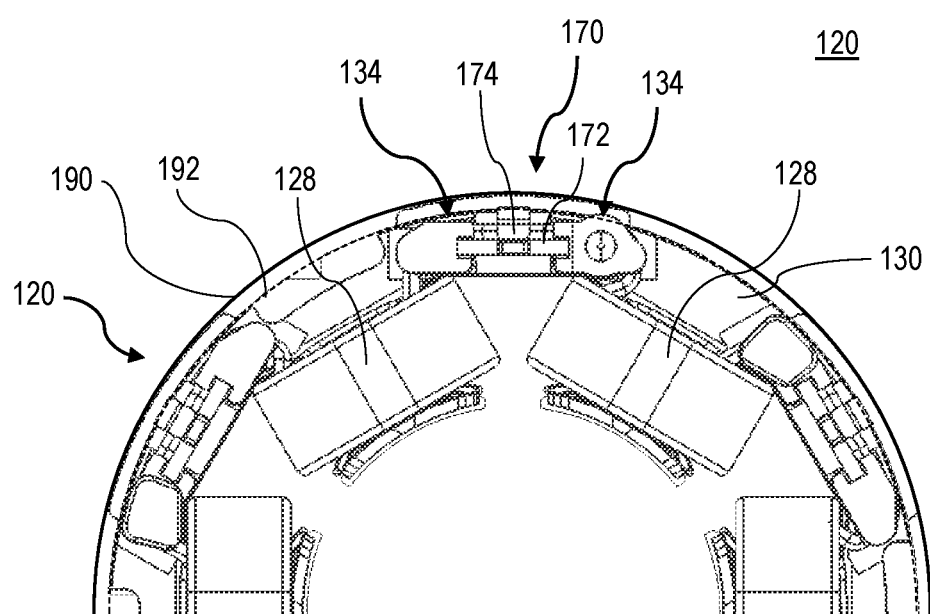
FIG. 16 depicts a partial axial view of the stator assembly, according to an embodiment.

FIG. 16 depicts a partial axial view of the stator assembly 120, according to an embodiment. As discussed above, cross-over wires 180 are only provided between adjacent stator windings 128, and not around the stator 120 between opposite windings of the same phase or windings of different phase. This provides an advantage in that the entire body of the stator terminals 170 can be contained within a first circular envelope 190 defined by the outer surface of the stator 120. In an embodiment, the outermost parts of the stator terminals 170 form a second circular envelope 192 that has a smaller diameter of the first circular envelope 190 defined by the outer surface of the stator 120. This is in contrast to prior art stator designs with in-line stator terminals, where, in order to accommodate a large number of cross-over wires on the end surface of the stator, the stator terminals are mounted on the outer edge of the stator and at least a portion of the stator terminal 170 project outwardly beyond the circumferential envelope defined by the outer surface of the stator 120.

Figure 17:
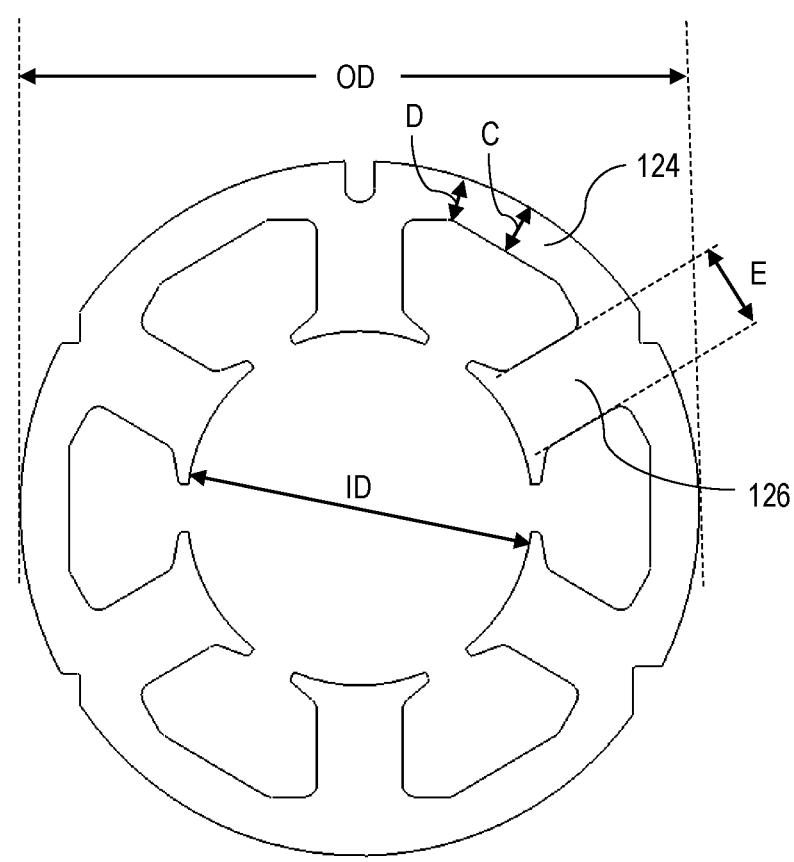
FIG. 17 depicts a side view of the stator without the windings, according to an embodiment.

FIG. 17 depicts a side view of the stator 120 without the windings 128. Since cross-over wires 180 do not extend around the stator 120, the thickness of the stator core 124 may be reduced in comparison to conventional stators where cross-over wires are supported on the stator between opposite windings of the same phase or stator windings of different phases. In an embodiment, the thickness of the stator core 124 is approximately in the range of 3.6 to 3.8 mm, preferably approximately 3.7 mm, at its thickest points C at or near the center of the stator slots, and is approximately in the range of 3.0 to 3.4 mm, preferably approximately 3.1 to 3.2 mm, at its thinnest points D proximate the stator teeth 126. This allows the lengths of the stator teeth 126 be similarly reduced and the inner diameter (ID) of the stator 120 to be increased without sacrificing the area of the slots available for disposition of stator windings 128. In an embodiment, the ratio of the stator inner diameter (ID) to its outer diameter (OD) is in the range of approximately 0.5 to 0.53, preferably approximately 0.51 to 0.52. In an example, where the stator OD is 0.51 mm, the ID may be sized at 26 mm, allowing it to receive a rotor having an outer diameter of 25 mm.

In an embodiment, in order to maximize the area of the slots available for disposition of stator windings 128, the thickness E of the stator tooth is reduced to approximately 2 times, and in particularly to 1.9 to 2.1 times, the thickness D of the stator core 124. Further, as shown in FIGS. 18A to 18F below, the stator core 124 is shaped to improve the wiring layout and maximize the density of wire per volume within the slots. It is noted that in these figures, a 51 mm diameter stator is depicted by way of example.

Figure 18A:
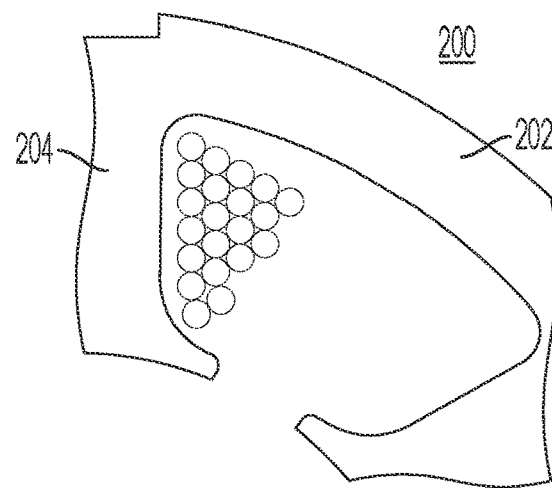
FIG. 18A depicts a side view of a conventional stator with a stator core having a uniform thickness of approximately 4.8 mm and stator teeth having a thickness of approximately 6.4 mm, according an embodiment.

FIG. 18A depicts a side view of a conventional stator 200 with a stator core 202 having a uniform thickness of approximately 4.8 mm and stator teeth 204 having a thickness of approximately 6.4 mm, according an embodiment. In this example, the stator ID is 24.5 mm. This arrangement provides a slot area of approximately 20.5 mm2 for disposition of stator windings. In an example, this stator may be wound with up to 21 turns of 20.5 AWG magnet wire.

Figure 18B:
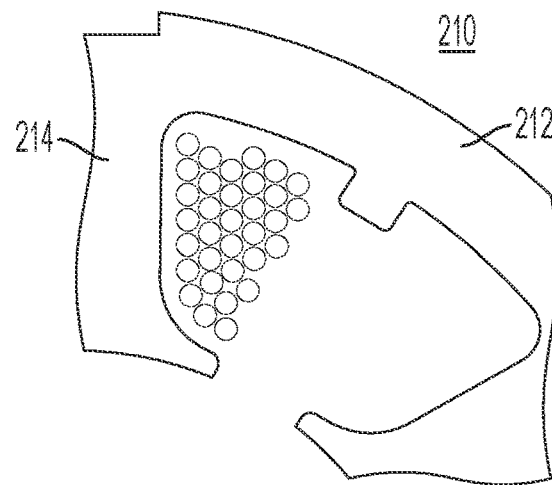
FIG. 18B depicts a side view of a stator similar to the stator of FIG. 18A, having a stator core with a reduced uniform thickness of approximately 3.5 mm and stator teeth 214 having a thickness of approximately 6.4 mm, according to an embodiment.

FIG. 18B depicts a side view of a stator 210 similar to stator 200 of FIG. 18A, having a stator core 212 with a reduced uniform thickness of approximately 3.5 mm and stator teeth 214 having a thickness of approximately 6.4 mm, according to an embodiment. In this example, by merely reducing the thickness of the stator core 212, the slot area is increased to approximately 28 mm2. In an example, this stator may be wound with up to 33 turns of 20.5 AWG magnet wire.

Figure 18C:
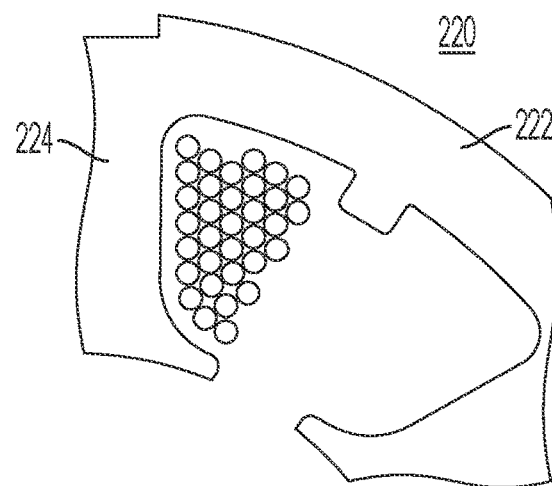
FIG. 18C depicts a side view of side view of a stator similar to FIG. 18B, having a stator core with a uniform thickness of approximately 3.5 mm, but with stator teeth having a reduced thickness of approximately 5.9 mm, according to an embodiment.

FIG. 18C depicts a side view of side view of a stator 220 similar to FIG. 18B, having a stator core 222 with a uniform thickness of approximately 3.5 mm, but with stator teeth 224 having a reduced thickness of approximately 5.9 mm, according to an embodiment. In this example, by reducing the thickness of the stator teeth 224, the slot area is increased to approximately 29 mm2. In an example, this stator may be wound with up to 33 turns of 20.5 AWG magnet wire.

Figure 18D:
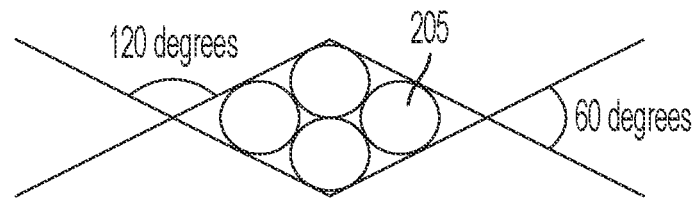
FIG. 18D depicts a cross-sectional view of magnet wires having an optimized geometric layout for maximizing wire density of the stator windings, according to an embodiment.
Figure 18E:
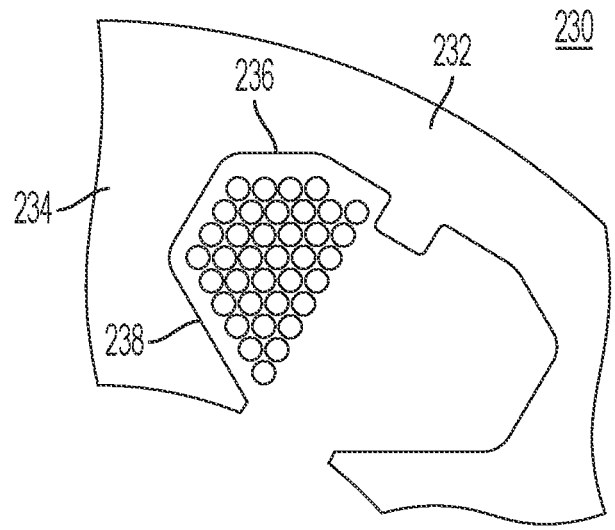
FIG. 18E depicts a side view of side view of a stator similar to FIG. 18C but including a stator core and stator teeth shaped to improve wire layout as shown in FIG. 18D in order to increase wire density of the stator windings, according to an embodiment.
Figure 18F:
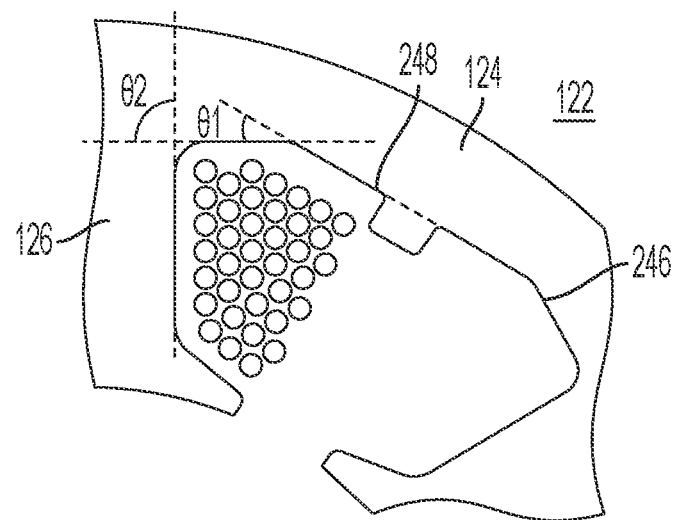
FIG. 18F depicts a side view of side view of a stator corresponding to FIGS. 3-17, according to an embodiment.

FIG. 18D depicts a cross-sectional view of magnet wires 205 having an optimized geometric layout for maximizing wire density of the stator windings 128, according to an embodiment. In an embodiment of the invention, given the same motor speed and/or torque requirements, the same stator ID and OD, and the same winding machine and process, this layout reduces the amount of air gap between the magnet wires 205. As such, this wiring layout allows a greater number of turns of the magnet wire, or a greater thickness of the magnet wire, to be wound for each stator winding. FIGS. 18E and 18F described below aim to shape the stator core and/or winding to achieve this wire layout.

FIG. 18E depicts a side view of side view of a stator 230 similar to FIG. 18C but including a stator core 232 and stator teeth 234 shaped to improve wire layout as shown in FIG. 18D in order to increase wire density of the stator windings 128. In an embodiment, stator 230 includes a stator core 232 with a non-uniform thickness of approximately 3.1 mm to 3.8 mm and stator teeth 224 having a non-uniform thickness of approximately 4.9 mm to 8.2 mm, according to an embodiment. In an embodiment, portion 236 of the stator core 232 and portion 238 of the stator teeth 234 are angled to achieve the wire layout as shown in FIG. 18D. While this design in fact reduces the slot area to approximately 26 mm2, it allows the stator 230 to be wound with up to 37 turns of 20.5 AWG magnet wire.

FIG. 18F depicts a side view of side view of the stator 122, as described in FIGS. 6 and 7 of this disclosure, according to an embodiment. Stator 122 is similar to stator 210 of FIG. 18E in some respects, but the stator core 124 and stator teeth 126 are shaped to further increase the slot area while optimizing wire layout. In an embodiment, stator core 124 is provided with a non-uniform thickness of approximately 3.1 mm to 3.7 mm (i.e., distances C and D in FIG. 17), and each stator tooth 126 includes a substantially uniform thickness of approximately 35.9 mm (not including the tooth tips), according to an embodiment. In an embodiment, an angular portion 246 of the stator core 124 extends at an angle θ1 from the main inner surface 248 of the stator core 124, where θ1 is approximately in the range of 25 to 35 degrees, preferably approximately 30 degrees. Angular portion 246 forms an angle θ2 with the stator tooth 126 that is approximately in the range of 80 to 100 degrees, preferably approximately 90 degrees. This design substantially achieves the desired wire layout of FIG. 18D but increases the slot area to approximately 29 mm2. This arrangement allows the stator 122 to be wound with up to 38 turns of 20.5 AWG magnet wire.

The results discussed above are summarized in Table 2 below:

TABLE 2

|  | Stator 200 | Stator 210 | Stator 220 | Stator 230 | Stator 122 |
| --- | --- | --- | --- | --- | --- |
| Tooth Width | 6.6 mm | 6.6 mm | 5.9 mm | 4.9-8.2 mm | 5.9 mm |
| Core Width | 4.8 mm | 3.5 mm | 3.4 mm | 3.1-3.8 mm | 3.1-3.7 mm |
| ID | 24.5 mm | 24.5 mm | 26 mm | 26 mm | 26 mm |
| Slot Area | 20.5 mm$^2$ | 27.9 mm$^2$ | 28.9 mm$^2$ | 25.7 mm$^2$ | 29.0 mm$^2$ |

The maximum number of turns of different sized magnet wires for each of the stators described above are summarized in Table 3 below:

TABLE 3

| Wire Size | Stator 200 | Stator 210 | Stator 220 | Stator 230 | Stator 122 |
| --- | --- | --- | --- | --- | --- |
| 18.0 AWG | 10 T | 14 T (+40%) | 16 T (+60%) | 17 T (+70%) | 19 T (+90%) |
| 19.5 AWG | 17 T | 22 T (+29%) | 25 T (+47%) | 27 T (+59%) | 30 T (+76%) |
| 20.5 AWG | 21 T | 29 T (+38%) | 33 T (+57%) | 37 T (+76%) | 38 T (+81%) |

Figure 19:
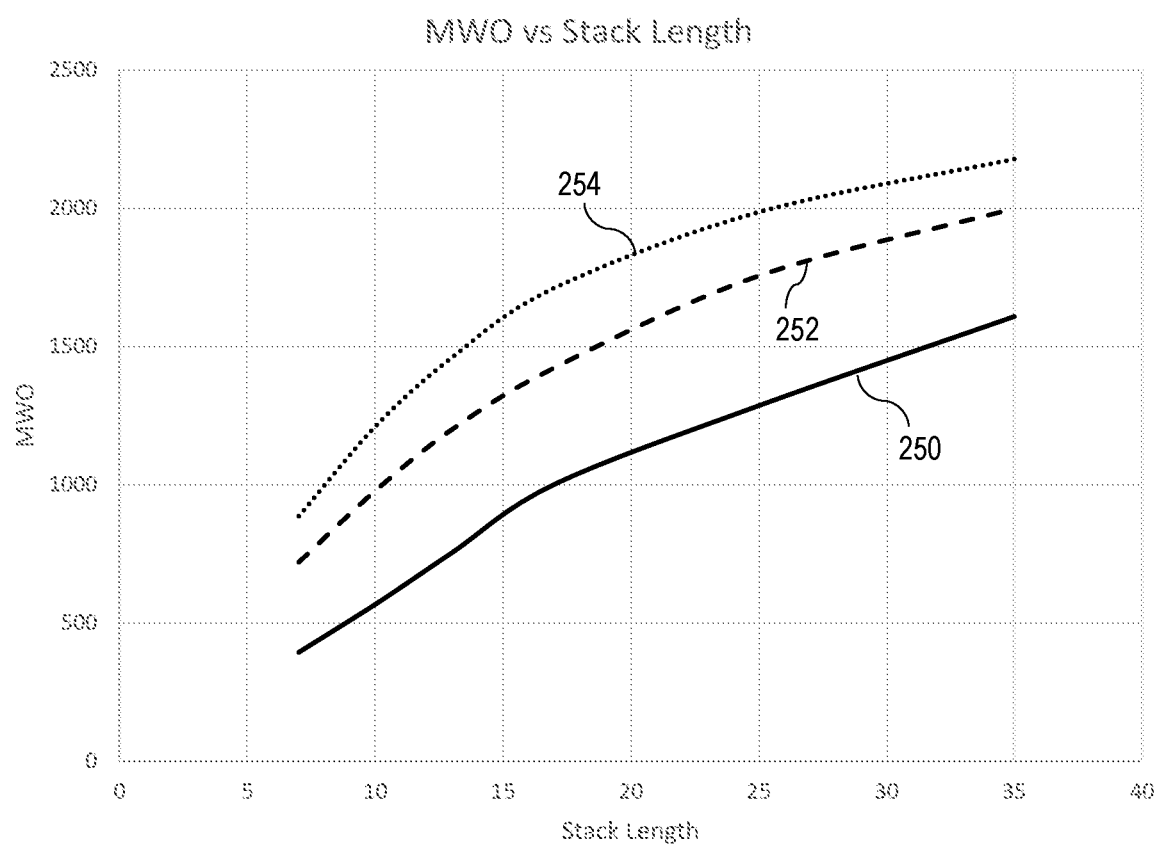
FIG. 19 depicts a comparative diagram showing the maximum power output performing of motor including a conventional stator, an embodiment of an improved stator interfacing a rotor having embedded magnets, and an embodiment of an improved stator interfacing a rotor having surface-mount magnets.

FIG. 19 depicts a comparative diagram showing the maximum power output performing of motor including a conventional stator (plot 250), stator 122 interfacing a rotor having embedded magnets (plot 252), and stator 122 interfacing a rotor having surface-mount magnets (plot 254). In this diagram, as is commonly understood by those skilled in the art, the motor power output increases as the motor stack length is increased. In an embodiment, as shown in this diagram, the motor maximum power output of at least 2000 watts may be achieved using a stator having a 35 mm length and 51 mm outer diameter. This represents an improvement of approximately 25% for larger stack length and up to approximately 85% for a smaller stack length. When using the same stator with a surface-mount rotor design, the motor maximum power output of at least 2200 watts may be achieved. This represents an improvement of approximately 35% for larger stack length and up to approximately 125% for a smaller stack length.

Figure 20:
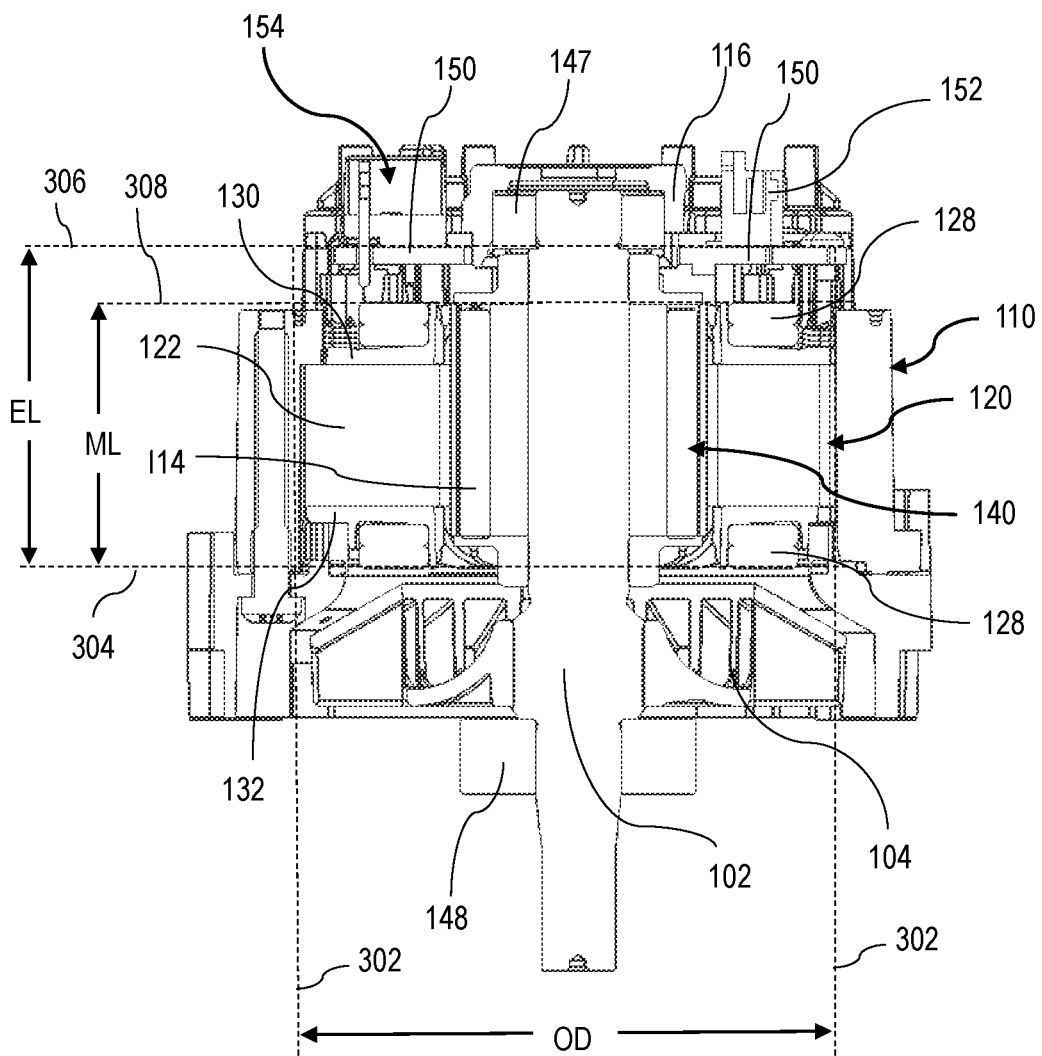
FIG. 20 depicts the side cross-sectional view of FIG. 4, additionally depicting motor magnetic length and electrical length, according to an embodiment.

FIG. 20 depicts the side cross-sectional view of the motor 100 similar to FIG. 4, additionally denoting an electrical envelope and a magnetic envelope of the motor 100, according to an embodiment.

In an embodiment, electrical envelope in this figure designates the total volume of the motor 100 where electrical and electro-magnetic components, including the circuit board 150 and all the wiring connections between the stator windings 128, are located. The electrical envelope is the volume of the motor that is peripherally bound by a generally cylindrical boundary 302 extending along a radially outermost portion of the stator assembly 120 and having a diameter OD. The electrical envelope is further axially bound by a front plane 304 at a frontmost point of the stator assembly and the rotor, in this example the frontmost tip of the stator windings 128, and a rear plane 306 at a rearmost point of the electro-magnetic part of circuit board 150, in this example the surface of the circuit board 150 opposite the stator assembly 120. Electrical envelope has a length EL.

In an embodiment, the magnetic envelope is bound the generally cylindrical boundary 302, the front plane 304, a rear plane 308 at a rearmost point of the stator windings 128. The magnetic envelope has a length ML that is smaller than the length EL.

FIG. 21 depicts a table comparing performance characteristics of the motor 100 to conventional BLDC motors. As demonstrated in this table, motor 100 is capable of producing higher maximum power output and higher motor constant for the given motor electrical envelope 300 than comparable known BLDC motors.

Four examples of motor 100 are provided in this table including different numbers of parallel sets of stator windings per tooth. The motor electrical envelope for these exemplary motors 100 are of the same geometry (including stator diameter of 51 mm and electrical length LE of 40 mm) and same volume (approximately 81,670 mm^3 in this example). The motor magnetic envelope for these exemplary motors 100 are also of the same geometry (including stator diameter of 51 mm and magnetic length ML of 36.4 mm) and same volume (approximately 74,400 mm^3 in this example). By comparison, three exemplary conventional motors are also included. The comparative conventional BLDC motors have the same diameter (example 1), smaller diameter (example 2), and larger diameter (example 3), but the lengths of the respective motors are modified to maintain the same electric envelope (approximately 81,670 mm^3) and magnetic envelope (approximately 74,400 mm^3) as the four exemplary motors 100.

As can be seen, given the same motor electrical envelope and magnetic envelope described above, the motor maximum power output for motor 100 increases from 1840 watts to 1895 watts (a 3% increase) when using two parallel windings per tooth, to 1922 watts (a 4% increase) when using three parallel windings per tooth, and to 1950 watts (a 6% increase) when using four parallel windings per tooth. Any of these configurations represents significant increases of maximum power output over conventional BLDC motors of the same size. It can be seen that the conventional BLDC motors having equivalent motor envelope and electrical envelope to motor 100 produce maximum power output in the range of approximately 1000 watts to 1500 watts, i.e., approximately 18% to 45% less than motor 100 given the same size electrical envelope and same size magnetic envelope.

Furthermore, the motor size (Km) constant of motor 100 increases from when using two or more sets of parallel windings per tooth. As understood by those skilled in the art, the Km constant is a parameter for determining the efficiency and capacity of a motor. The Km constant is calculated as a function of the torque constant Kt and the resistance of the motor R, Km=Kt/R2 or Km=Kt*I/P, where torque constant Kt is the torque produced divided by motor current. Thus, the Km constant represents the capability of the motor to produce power normalized by resistance of the motor. In an embodiment, the Km constant of motor 100 increases from 0.0762 N·m/√W to 0.0804 N·m/√W (a 5% increase) when using two parallel windings per tooth, to 0.0826 N·m/√W (an 8% increase) when using three parallel windings per tooth, and to 0.0851 N·m/√W (a 10% increase) when using four parallel windings per tooth.

Any of these configurations represents a significant increase the Km constant over conventional BLDC motors having equivalent motor envelope and electrical envelope to motor 100. It can be seen that the Km constants of the conventional BLDC motors having equivalent motor envelope and electrical envelope to motor 100 are in the range of approximately 0.0471 to 0.0636 N·m/√W, i.e., approximately 18% to 50% less than the motor 100 given the same size electrical envelope and same size magnetic envelope.

In an embodiment, to evaluate the motor performance irrespective of the size of the motor, a ratio of the Km constant to the electrical envelope and/or the magnetic envelope is provided.

In an embodiment, the ratio of the Km constant to the magnetic envelope of the motor is greater than 900 (N·m/√W)/m^3 in an embodiment, particularly greater than 940 (N·m/√W)/m^3 in an embodiment, more particularly greater than 980 (N·m/√W)/m^3, and even more particularly greater than 1020 (N·m/√W)/m^3. When using two or more sets of parallel coils per tooth, the ratio of the Km constant to magnetic envelope of the motor is greater than 1080 (N·m/√W)/m^3 when using two parallel coils per tooth, greater than 1100 (N·m/√W)/m^3 when using three parallel coils per tooth, and greater than 1140 (N·m/√W)/m^3 when using four parallel coils per tooth. By comparison, the ratios of the Km constant to magnetic envelope of conventional BLDC motors are at most 855 (N·m/√W)/m^3. This represents a performance increase, even when using merely a single set of coils per tooth on motor 100.

In an embodiment, the ratio of the Km constant to the electrical envelope of the motor is greater than 810 (N·m/√W)/m^3 in an embodiment, particularly greater than 850 (N·m/√W)/m^3 in an embodiment, and more particularly greater than 890 (N·m/√W)/m^3, and even more particularly greater than 930 (N·m/√W)/m^3. When using two or more sets of parallel coils per tooth, the ratio of the Km constant to electrical envelope of the motor is greater than 970 (N·m/√W)/m^3 when using two parallel coils per tooth, greater than 1000 (N·m/√W)/m^3 when using three parallel coils per tooth, and greater than 1030 (N·m/√W)/m^3 when using four parallel coils per tooth. By comparison, the ratios of the Km constant to electrical envelope of conventional BLDC motors are at most 780 (N·m/√W)/m^3. This represents a performance increase, even when using merely a single set of coils per tooth on motor 100.

Figure 22:
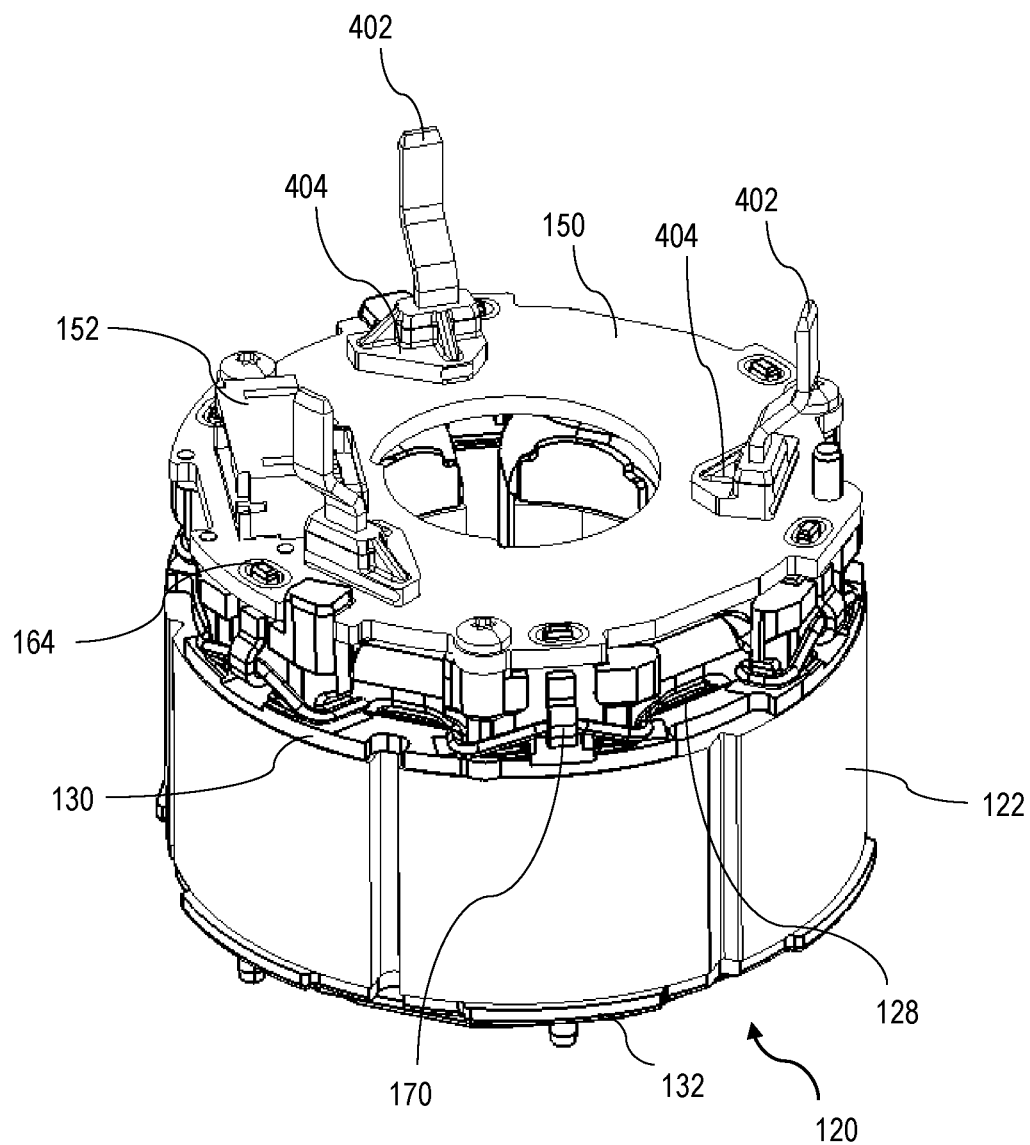
FIG. 22 depicts a perspective view of the motor assembly with the circuit board having an alternative terminal arrangement, according to an embodiment.

FIG. 22 depicts a perspective view of the motor assembly 120 with the circuit board 150 mounted thereon, according to an embodiment. In this embodiment, instead of a power terminal block 154 as previously described, the circuit board 150 is provided with a series of (in this example three) discrete in-line motor terminals 402. In an embodiment, the motor terminals 402 are provided at an equidistant angular orientation, e.g., at 120 degrees apart. In an embodiment, each motor terminal 402 is radially in line with one of the stator terminals 170. In an embodiment, each motor terminal 402 is mounted on the circuit board 150 via an insulating pad 404. In an embodiment, each motor terminal 402 includes a slanted portion, allowing an axis of the outer tip of the motor terminal 402 to be positioned close to the outer periphery of the circuit board 150.

Figure 23:
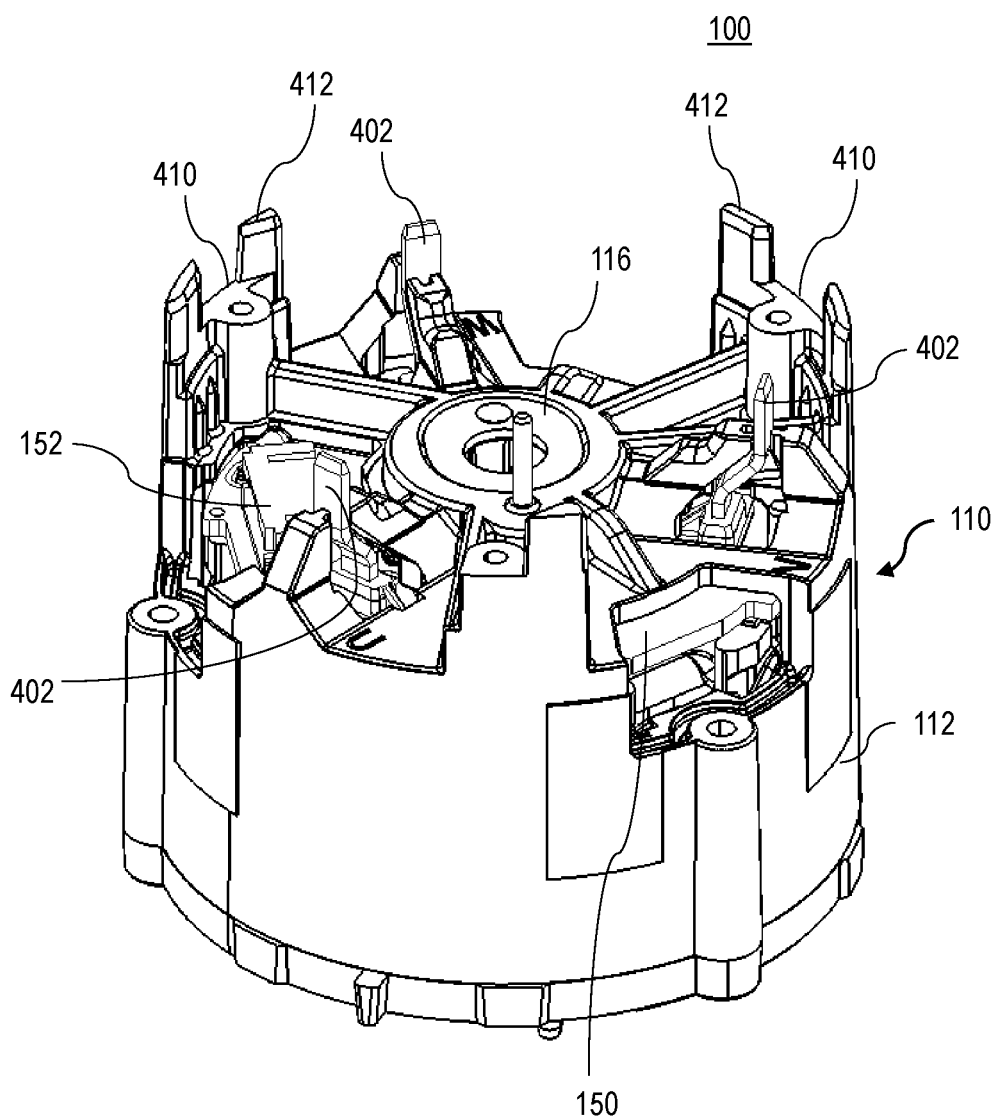
FIG. 23 depicts a perspective view of the motor including the terminal arrangement of FIG. 22, according to an embodiment.
Figure 24:
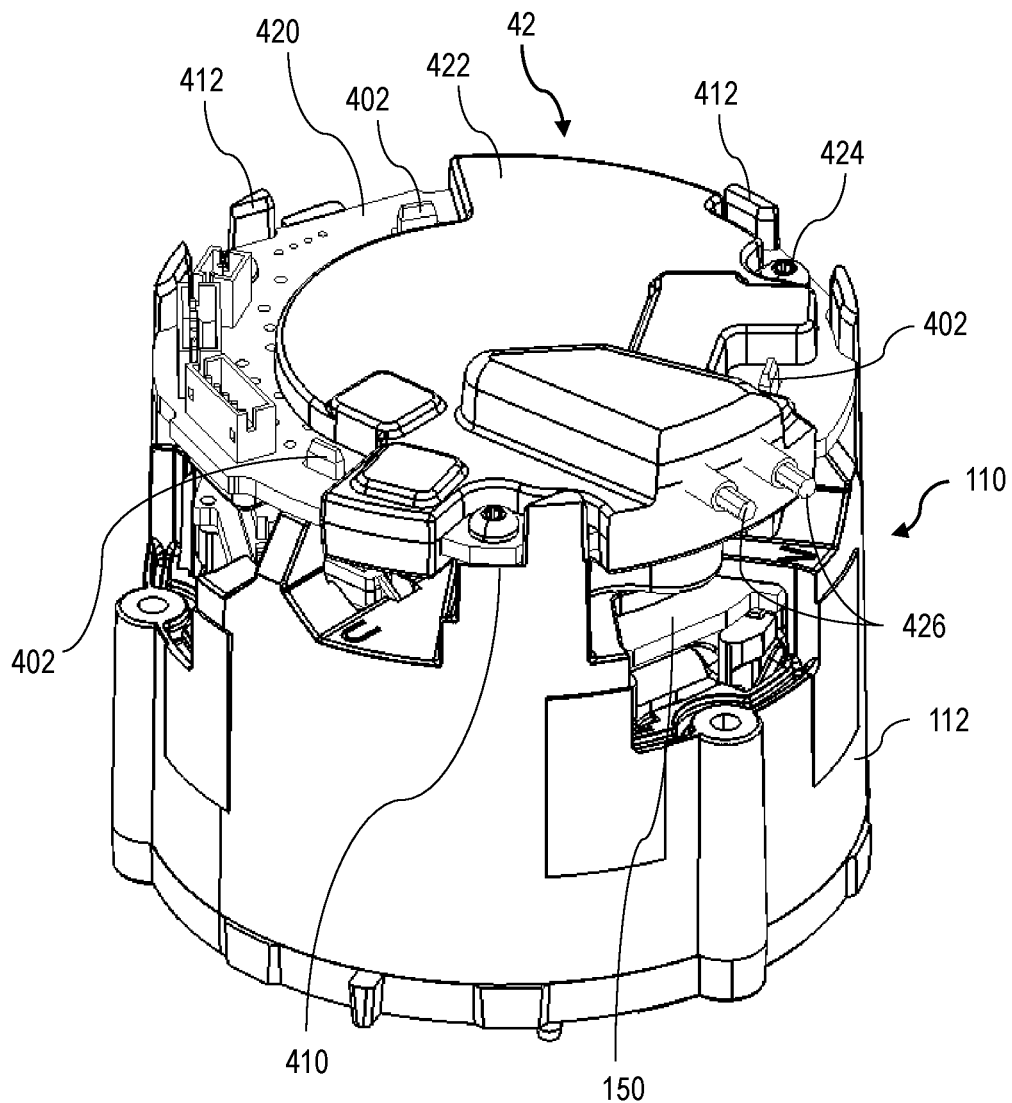
FIG. 24 depicts a perspective view of the motor with a power module mounted directed to the motor housing, according to an embodiment.

FIG. 23 depicts a perspective view of the motor 100 including the above-described motor terminal 402 arrangement, according to an embodiment. FIG. 24 depicts a perspective view of the motor 100 with power module 42 mounted directed to the motor housing 110, according to an embodiment. In an embodiment, as previously described, power module 42 includes six power switches (e.g., FETs or IGBTs) configured as a three-phase inverter switch for driving the motor 100. In an embodiment, power module 42 is disc-shaped with a circumference that is approximately equal to or slightly smaller than the circumference of the motor housing 110. In an embodiment, power module 42 includes a power circuit board 420 on which the power switches (not shown) are mounted, and an overmold structure 422 formed around the power switches. In an embodiment, power terminals 426 are further supported by the overmold structure 422 and are coupled to the battery receptacle 20 and/or the switch module 38 to supply electric power to the power switches.

In an embodiment, motor housing 110 is provided with a series of support posts 410 positioned to structurally support the power module 42. In an embodiment, the power module 42 is mounted above the support posts 410 and secured to the posts 410 via fasteners 424. In an embodiment, each support post 410 includes two legs 412 that project around the power module 42.

In an embodiment, end tips of the terminals 402 are received into corresponding slots of the power circuit board 420. This allows the power circuit board 420 to make a direct electrical connection to the terminals 402, and thus the stator windings 128, without a need for intermediary wires. Accordingly, this embodiments provides a two circuit board arrangement disposed in parallel rearward of the stator assembly 120, with circuit board 150 being located inside the motor housing 110 and configured to support Hall sensors 151 and metal traces for interconnection of the stator windings 128, and power circuit board 420 being located outside the motor housing 110 and configured to support the power switches for driving the stator windings 128.

The above-described configuration of the motor 100, particularly in combination with the power module 42 mounted directly to the rear of the motor housing 110, provides high power in a small package highly desirable for many power tool, industrial tools, motorized outdoor products, and home appliances. FIG. 1 described above provides an example of a power tool that benefits from the high density advantages of the motor 100 and power module 42. An example of an outdoor product, in this example an edger, utilizing the motor 100 and power module 42 of this disclosure, is described here with reference to FIGS. 25 and 26.

Figure 25:
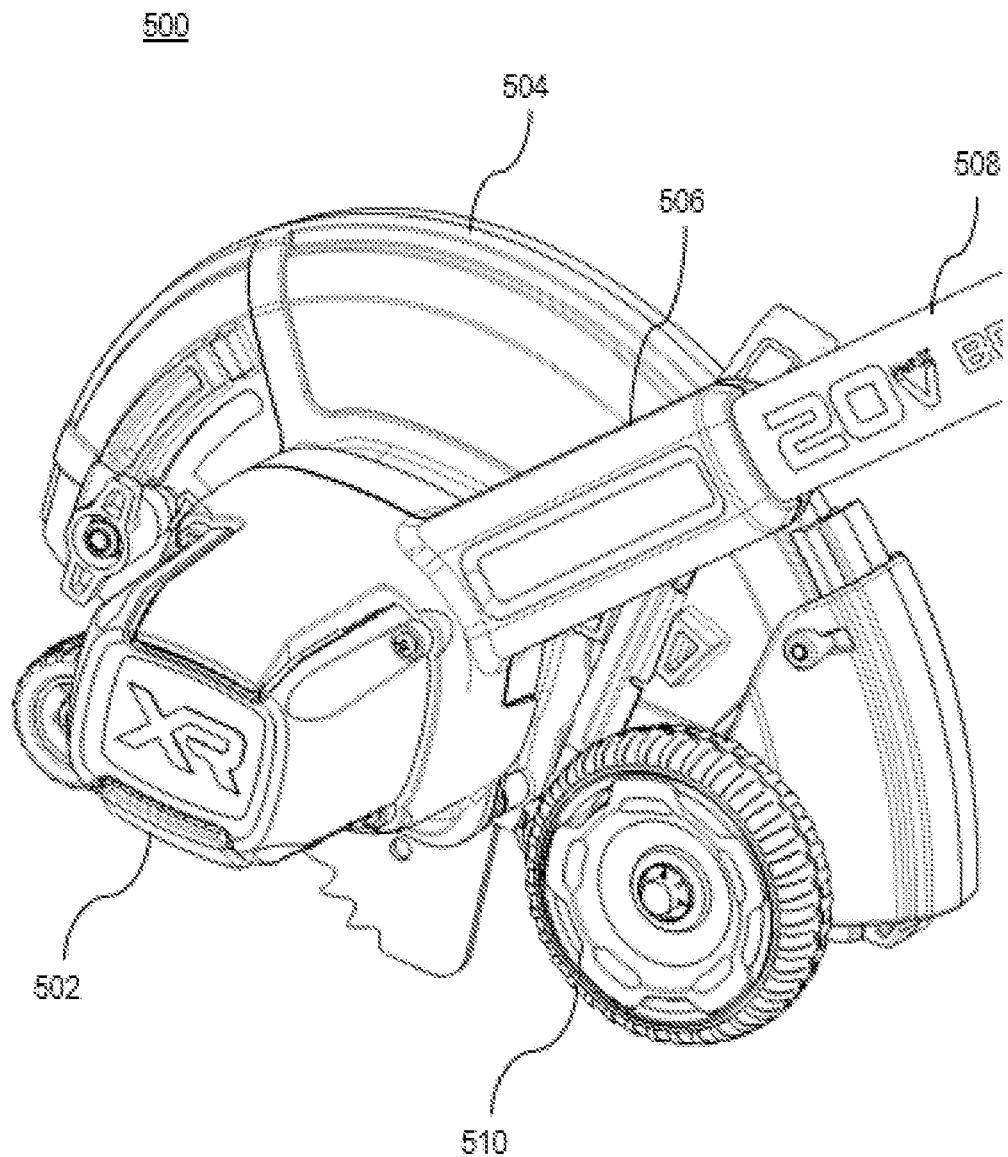
FIG. 25 depicts a partial perspective view of an electric edger including the above-described motor and power module arrangement, according to an embodiment

FIG. 25 depicts a partial perspective view of an electric edger 500, according to an embodiment. In an embodiment, edger 500 includes a housing 502, a blade guard 504 mounted on one side of the housing 502, a lower handle portion 506 extending upwardly from the housing 502 at an angle, a tubular rod 508 extending from the lower handle portion 506 to a grip handle (not shown) accommodating a trigger switch (not shown) actuatable by a user, and wheels 510. A battery pack (not shown) may be mounted to the electric edger 500 near the grip handle to supply electric power. Operational and structural details of the edger 500 are beyond the scope of this disclosure. Reference is made to U.S. Pat. No. 5,325,928, which is incorporated herein by reference in its entirety, for details of an electric edger.

Figure 26:
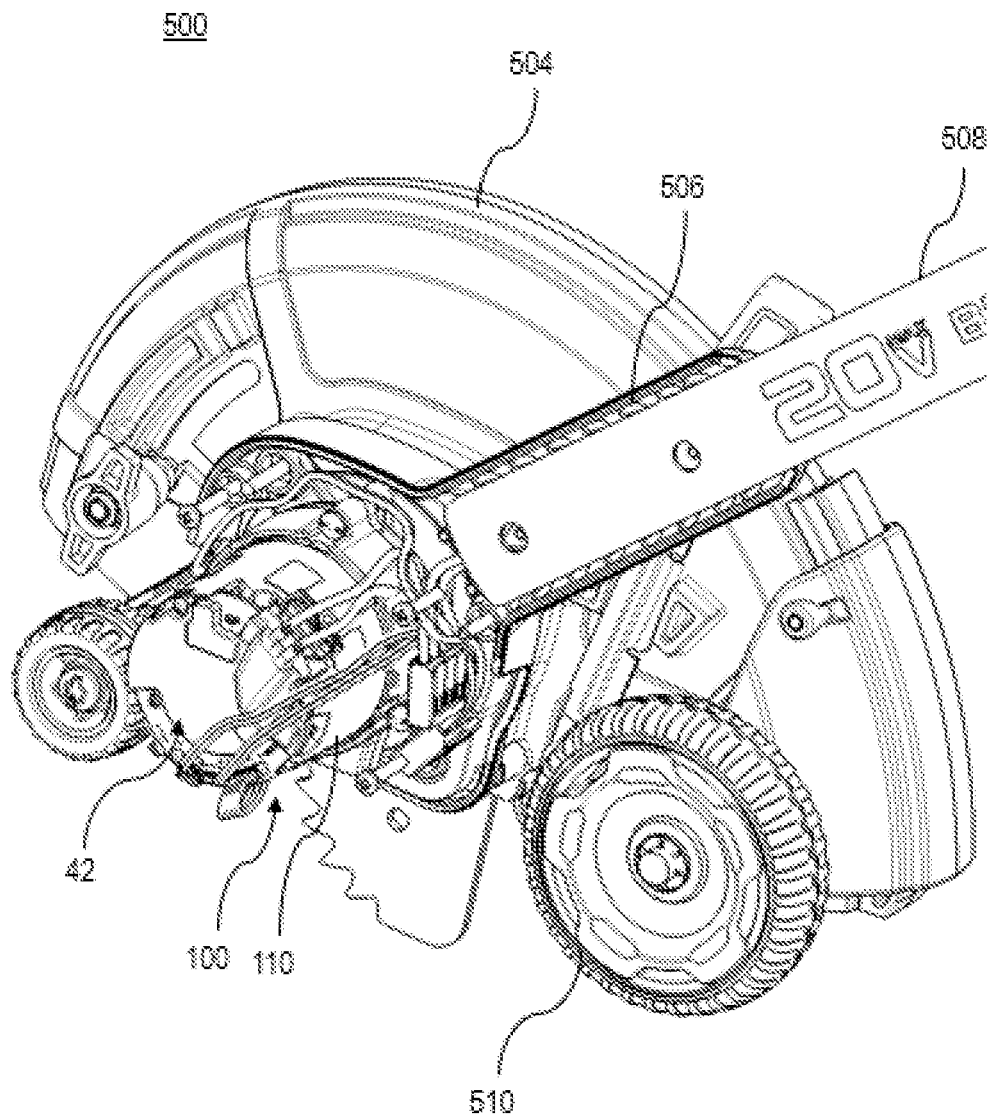
FIG. 26 depicts a partial perspective view of the electric edger with a front portion of its housing removed to expose the motor and the power module, according to an embodiment.

FIG. 26 depicts a perspective view of the electric edger 100 with a front portion of the housing 502 removed, according to an embodiment. As shown here, the housing 502 is sized to house the motor 100 and the power module 42 mounted to the rear of the motor housing 110. An output of the motor 100, which is not visible in this figure, is rotationally coupled, via a gear reduction mechanism and an output spindle, to a cutting blade located within the blade guard 504. As such, in an embodiment, the power module 42 and the motor housing 110 are compactly contained within the housing 502. In an embodiment, a microcontroller for controlling the switching operation of the power switches is also disposed within the housing 502. In an embodiment, the microcontroller may be provided separately from the power module 42 or integrally on the circuit board as the power switching within the power module 42. As such, the housing 502 accommodates all the electronics and control features required for driving the motor.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
a housing; and
a brushless direct-current (BLDC) motor disposed within the housing, the motor comprising:
a rotor assembly including rotor shaft extending along a longitudinal axis and a rotor supporting a plurality of magnets mounted on the rotor shaft;
a stator assembly including a stator comprising a stator core and a plurality of stator teeth radially extending from the stator core and defining a plurality of slots therebetween, and a plurality of stator windings wound on the plurality of stator teeth; and
a circuit board disposed adjacent a rear end of the stator assembly and including a plurality of conductive traces facilitating a one of a parallel or a series connection between at least two stator windings of the plurality of stator windings corresponding to the same phase of the motor,
wherein a ratio of a motor size (Km) constant of the motor to an electrical envelope of the motor is greater than approximately 850 (N·m/√W)/m^3, wherein the electrical envelope of the motor is radially bound by an outer cylindrical boundary of the stator assembly and axially bound by a front radial plane located at a frontmost point of the stator windings and a rear radial plane located at a rearmost point of the circuit board.

2. The power tool of claim 1, wherein the motor is configured to output a maximum power output of at least greater than or equal to approximately 1840 watts.

3. The power tool of claim 1, wherein the stator assembly has an outer diameter in the range of 40 mm to 60 mm.

4. The power tool of claim 1, wherein the plurality of stator windings include a first plurality of stator windings wound on the plurality of stator teeth, and a second plurality of stator windings wound on the plurality of stator teeth such that, on each stator tooth, one of the first plurality of windings is provided in parallel to one of the second plurality of stator windings.

5. The power tool of claim 4, wherein the stator assembly further comprises a plurality of stator terminals provide between respective plurality of stator teeth in the circumferential direction of the stator, wherein the circuit board is physically coupled to the plurality of stator terminals to electrically connect the plurality of stator windings.

6. The power tool of claim 1, wherein the stator has an inner diameter defined by inner ends of the stator teeth and an outer diameter defined by an outer surface of the stator core, a ratio of the inner diameter to the outer diameter being in the range of 0.5 to 0.53.

7. The power tool of claim 6, wherein the stator core has a variable thickness and, for each of the plurality of slots, includes a first portion forming an approximately right angle with the respective stator tooth and a second portion that is substantially normal to a radius of the stator assembly and forms an angle of approximately 25 to 35 degrees with the first portion.

8. The power tool of claim 1, wherein an axial length of the electrical envelope is less than or equal to approximately 40 mm.

9. A power tool comprising:
a housing; and
a brushless direct-current (BLDC) motor disposed within the housing, the motor comprising:
  a rotor assembly including rotor shaft extending along a longitudinal axis and a rotor supporting a plurality of magnets mounted on the rotor shaft; and
  a stator assembly including a stator comprising a stator core and a plurality of stator teeth radially extending from the stator core and defining a plurality of slots therebetween, and a plurality of stator windings wound on the plurality of stator teeth,
  wherein a ratio of a motor size (Km) constant of the motor to a magnetic envelope of the motor is equal to or greater than 980 (N·m/√W)/m^3, wherein the magnetic envelope of the motor is radially bound by an outer cylindrical boundary of the stator assembly and axially bound by a frontmost and rearmost ends of the stator windings.

10. The power tool of claim 9, wherein the motor is configured to output a maximum power output of at least greater than or equal to approximately 1840 watts.

11. The power tool of claim 9, wherein the stator assembly has an outer diameter in the range of 40 mm to 60 mm.

12. The power tool of claim 9, wherein the plurality of stator windings include a first plurality of stator windings wound on the plurality of stator teeth, and a second plurality of stator windings wound on the plurality of stator teeth such that, on each stator tooth, one of the first plurality of windings is provided in parallel to one of the second plurality of stator windings.

13. The power tool of claim 12, further comprising a circuit board disposed adjacent a rear end of the stator assembly and including a plurality of conductive traces facilitating a one of a parallel or a series connection between at least two stator windings of the plurality of stator windings corresponding to the same phase of the motor.

14. The power tool of claim 13, wherein the stator assembly further comprises a plurality of stator terminals provide between respective plurality of stator teeth in the circumferential direction of the stator, wherein the circuit board is physically coupled to the plurality of stator terminals to electrically connect the plurality of stator windings.

15. The power tool of claim 9, wherein the stator has an inner diameter defined by inner ends of the stator teeth and an outer diameter defined by an outer surface of the stator core, a ratio of the inner diameter to the outer diameter being in the range of 0.5 to 0.53.

16. The power tool of claim 15, wherein the stator core has a variable thickness and, for each of the plurality of slots, includes a first portion forming an approximately right angle with the respective stator tooth and a second portion that is substantially normal to a radius of the stator assembly and forms an angle of approximately 25 to 35 degrees with the first portion.

17. The power tool of claim 9, wherein an axial length of the magnetic envelope is less than or equal to approximately 36.4 mm.

* * * * *